(12) United States Patent
Huang et al.

(10) Patent No.: US 12,627,797 B2
(45) Date of Patent: May 12, 2026

(54) PREPROCESSING OF INPUT DATA FOR ADAPTIVE LOOP FILTER IN VIDEO CODING

(71) Applicant: QUALCOMM Incorporated, San Diego, CA (US)

(72) Inventors: Han Huang, San Diego, CA (US); Cheng-Teh Hsieh, Del Mar, CA (US); Nan Hu, San Diego, CA (US); Vadim Seregin, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 44 days.

(21) Appl. No.: 18/589,777

(22) Filed: Feb. 28, 2024

(65) Prior Publication Data

US 2024/0297989 A1 Sep. 5, 2024

Related U.S. Application Data

(60) Provisional application No. 63/487,698, filed on Mar. 1, 2023.

(51) Int. Cl.
*H04N 19/00* (2014.01)
*H04N 19/103* (2014.01)
(Continued)

(52) U.S. Cl.
CPC ......... *H04N 19/117* (2014.11); *H04N 19/103* (2014.11); *H04N 19/132* (2014.11); *H04N 19/136* (2014.11); *H04N 19/176* (2014.11)

(58) Field of Classification Search
None
See application file for complete search history.

(56) References Cited

U.S. PATENT DOCUMENTS

| | | | |
|---|---|---|---|
| 11,778,177 B2 | 10/2023 | Karczewicz et al. | |
| 2010/0254450 A1* | 10/2010 | Narroschke | H04N 19/82 |
| | | | 375/240.03 |

(Continued)

FOREIGN PATENT DOCUMENTS

| | | |
|---|---|---|
| EP | 2323407 A1 | 5/2011 |
| EP | 2375745 A1 | 10/2011 |

(Continued)

OTHER PUBLICATIONS

Esenlik S., et al., "CE 8: Results for Adaptive Loop Filter Using Prediction and Residual (3-Input-ALF)," 4. JCT-VC Meeting, Daegu, (Joint Collaborative Team on Video Coding of ISO/IEC JTC1/SC29/WG11 and ITU-TSG. 16), No. JCTVC-D217, Jan. 20, 2011-Jan. 28, 2011, Jan. 22, 2011, XP030226724, XP030226723, pp. 1-9, the whole document.

(Continued)

*Primary Examiner* — Zhihan Zhou
(74) *Attorney, Agent, or Firm* — Shumaker & Sieffert, P.A.

(57) ABSTRACT

A device for decoding video data can be configured to determine a prediction block for a current block of the video data; determine a residual block for the current block of the video data; process residual data of the residual block to determine processed residual data; store the processed residual data; add the prediction block to the residual block to determine a reconstructed block; and perform adaptive loop filtering (ALF) on the reconstructed block, based on the processed residual data.

14 Claims, 22 Drawing Sheets

(51) Int. Cl.
| | |
|---|---|
| *H04N 19/117* | (2014.01) |
| *H04N 19/132* | (2014.01) |
| *H04N 19/136* | (2014.01) |
| *H04N 19/176* | (2014.01) |

(56) References Cited

U.S. PATENT DOCUMENTS

| | | | |
|---|---|---|---|
| 2014/0092969 A1* | 4/2014 | Lee ...................... | H04N 19/433 |
| | | | 375/240.15 |
| 2023/0010869 A1 | 1/2023 | Hu et al. | |

FOREIGN PATENT DOCUMENTS

| | | |
|---|---|---|
| WO | 2012008506 A1 | 1/2012 |
| WO | 2012013327 A1 | 2/2012 |

OTHER PUBLICATIONS

International Search Report and Written Opinion—PCT/US2024/017861—ISA/EPO—Jun. 6, 2024 16 Pages.

Yamakage T (Toshiba)., et al., "CE8 Subset2: Verification Results of Panasonic's Proposal JCTVC-D217," 95. MPEG Meeting, DAEGU, (Motion Picture Expert Group or ISO/IEC JTC1/SC29/WG11), No. m18997, Jan. 24, 2011-Jan. 28, 2011, Jan. 17, 2011, pp. 1-2, XP030047566.

Chang Y-J., et al., "Compression efficiency methods beyond VVC", JVET-U0100, Joint Video Experts Team (JVET) of ITU-T SG 16 WP 3 and ISO/IEC JTC 1/SC 29 21st Meeting, by teleconference, Jan. 6-15, 2021, pp. 1-13.

Chen J., et al., "Algorithm description for Versatile Video Coding and Test Model 2 (VTM 2)", JVET-K1002-v1, Joint Video Experts Team (JVET) of ITU-T SG 16 WP 3 and ISO/IEC JTC 1/SC 29/WG 11, 11th Meeting, Ljubljana, SI, Jul. 10-18, 2018, pp. 1-19.

Chen J., et al., "Algorithm Description of Joint Exploration Test Model 7 (JEM7)", 119 . MPEG Meeting, 7. JVET Meeting, Jul. 13, 2017-Jul. 21, 2017, JVET-G1001-V1, Joint Video Exploration Team (JVET) of ITU-T SG 16 WP3 and ISO/IEC JTC 1/SC 29/WG 11, No. m41357, No. G1001_v1, JVET-G1001, 7th Meeting, Torino, IT, N17055, Aug. 19, 2017, XP030150980, XP030023716, 50 Pages.

Coban M., et al., "Algorithm Description of Enhanced Compression Model 7 (ECM 7)", JVET-AB2025, Joint Video Experts Team (JVET)of ITU-T SG 16 WP 3 and ISO/IEC JTC 1/SC 2928th Meeting, Mainz, DE, Oct. 20-28, 2022, pp. 1-63.

Coban M., et al., "Preliminary Draft of Algorithm Description for Enhanced Compression Model 1 Software (ECM 1)", JVET-W0102-v2, Joint Video Expelts Team (JVET) of ITU-T SG 16 WP 3 and ISO/IEC JTC 1/SC 29, 23rd Meeting by Teleconference Jul. 7-16, 2021, pp. 1-18.

Hu N., et al., "AHG12: Using Samples Before Deblocking Filter for Adaptive Loop Filter", JVET-Z0146-v1, Joint Video Experts Team (JVET) of ITU-T SG 16 WP 3 and ISO/IEC JTC 1/SC 29 26th Meeting, by teleconference, Apr. 20-29, 2022, pp. 1-4.

Hu N., et al., "EE2-5: Adaptive filter Shape Switch and Using Samples before Deblocking Filter for Adaptive Loop Filter", JVET-AA0095-v1, Joint Video Experts Team (JVET) of ITU-T SG 16 WP 3 and ISO/IEC JTC 1/SC 29, 27th Meeting, by teleconference, Jul. 13-22, 2022, pp. 1-8.

ITU-T H.265: "Series H: Audiovisual and Multimedia Systems Infrastructure of Audiovisual Services—Coding of Moving Video", High Efficiency Video Coding, The International Telecommunication Union, Jun. 2019, 696 Pages.

ITU-T H.266: "Series H: Audiovisual and Multimedia Systems Infrastructure of Audiovisual Services—Coding of Moving Video", Versatile Video Coding, The International Telecommunication Union, Aug. 2020, 516 pages.

Jumakulyyev I., et al., "Non-EE2: ALF Classification Based on Residual Data", Qualcomm Inc, JVET-AC0173-v3, Joint Video Experts Team (JVET) of ITU-T SG 16 WP 3 and ISO/IEC JTC 1/SC 29, 29th Meeting, by Teleconference, Jan. 11-20, 2023, Jan. 5, 2023, pp. 1-5, XP030306822, the whole document.

Ma C., et al., "AHG12: Using prediction samples or residual samples for adaptive loop filter", JVET-AB0181-v1, Joint Video Experts Team (JVET) of ITU-T SG 16 WP 3 and ISO/IEC JTC 1/SC 29 28th Meeting, Mainz, De, Oct. 21-28, 2022, pp. 1-6.

Ma C., et al., "EE2-5.1: Using Prediction Samples or Residual Samples for Adaptive Loop Filter", JVET-AC0162-v2, Joint Video Experts Team (JVET) of ITU-T SG 16 WP 3 and ISO/IEC JTC 1/SC 29, 29th Meeting, by teleconference, Jan. 11-20, 2023, pp. 1-4.

\* cited by examiner

142

140

166

D2

164

D1

162

V

160

H

PREPROCESSING OF INPUT DATA FOR ADAPTIVE LOOP FILTER IN VIDEO CODING

This application claims the benefit of U.S. Provisional Patent Application No. 63/487,698, filed 1 Mar. 2023, the entire contents of which is incorporated herein by reference.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), ITU-T H.266/Versatile Video Coding (VVC), and extensions of such standards, as well as proprietary video codecs/formats such as AOMedia Video 1 (AV1) that was developed by the Alliance for Open Media. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

Some implementations of adaptive loop filtering (ALF) utilize one or both of residual samples or reconstructed samples to determine a filter used at the ALF stage. ALF is generally performed after deblocking filtering and SAO filtering, while residual samples and reconstructed samples are determined before deblocking filtering and SAO filtering. Thus, in order to use the residual samples or reconstructed samples for ALF, the residual samples and reconstructed samples need to be buffered while deblocking filtering and SAO are performed. This buffering requires increased hardware complexity.

To reduce the amount of required buffering, this disclosure describes techniques to process residual data of a residual block to determine processed residual data and store the processed residual data rather than the residual data itself. The processed residual data may have less data, e.g., fewer bits, than the residual data and, thus, require less memory to buffer. In some examples, the processing may also modify the residual data, such that the residual data is more likely to result in a better filter being selected during ALF.

According to an example of this disclosure, a method of decoding video data includes determining a prediction block for a current block of the video data; determining a residual block for the current block of the video data; processing residual data of the residual block to determine processed residual data; storing the processed residual data; adding the prediction block to the residual block to determine a reconstructed block; and performing adaptive loop filtering (ALF) on the reconstructed block, based on the processed residual data.

According to an example of this disclosure, a device for decoding video data includes a memory configured to store video data and one or more processors implemented in circuitry and configured to determine a prediction block for a current block of the video data; determine a residual block for the current block of the video data; process residual data of the residual block to determine processed residual data; store the processed residual data; add the prediction block to the residual block to determine a reconstructed block; and perform adaptive loop filtering (ALF) on the reconstructed block, based on the processed residual data.

According to an example of this disclosure, a computer-readable storage medium stores instructions that, when executed, cause one or more processors to determine a prediction block for a current block of video data; determine a residual block for the current block of the video data; process residual data of the residual block to determine processed residual data; store the processed residual data; add the prediction block to the residual block to determine a reconstructed block; and perform adaptive loop filtering (ALF) on the reconstructed block, based on the processed residual data.

According to an example of this disclosure, a device for decoding video data includes means for determining a prediction block for a current block of the video data; means for determining a residual block for the current block of the video data; means for processing residual data of the residual block to determine processed residual data; means for storing the processed residual data; means for adding the prediction block to the residual block to determine a reconstructed block; and means for performing adaptive loop filtering (ALF) on the reconstructed block, based on the processed residual data.

The details of one or more examples are set forth in the accompanying drawings and the description below. Other features, objects, and advantages will be apparent from the description, drawings, and claims.

DETAILED DESCRIPTION

Figure 1:
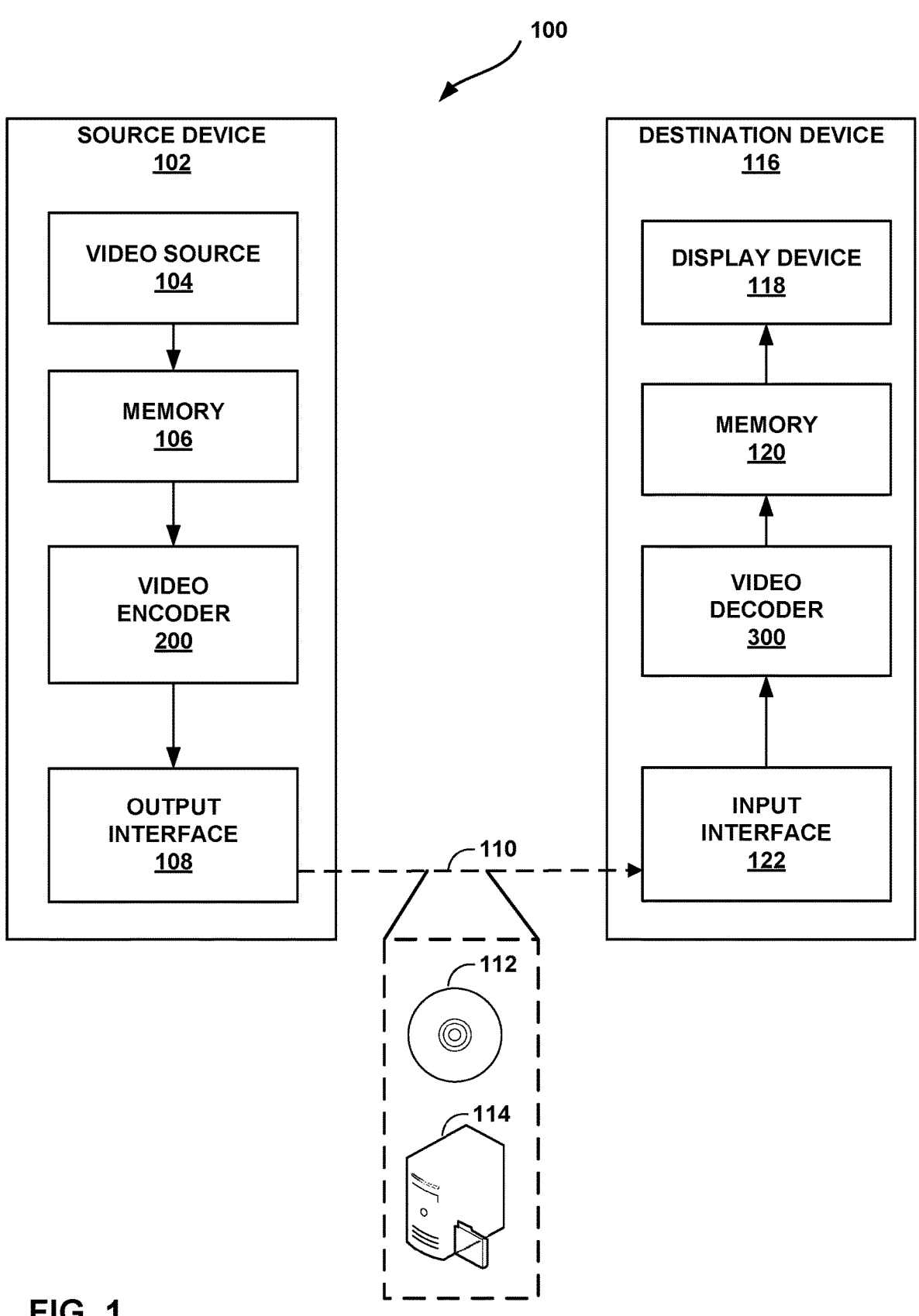
FIG. 1 is a block diagram illustrating an example video encoding and decoding system that may perform the techniques of this disclosure.

Video coding (e.g., video encoding and/or video decoding) typically involves predicting a block of video data from either an already coded block of video data in the same picture (e.g., intra prediction) or an already coded block of video data in a different picture (e.g., inter prediction). In some instances, the video encoder also calculates residual data by comparing the prediction block to the original block. Thus, the residual data represents a difference between the prediction block and the original block. To reduce the number of bits needed to signal the residual data, the video encoder transforms and quantizes the residual data and signals the transformed and quantized residual data in the encoded bitstream. The compression achieved by the transform and quantization processes may be lossy, meaning that transform and quantization processes may introduce distortion into the decoded video data.

A video decoder decodes and adds the residual data to the prediction block to produce a reconstructed video block that matches the original video block more closely than the prediction block alone. Due to the loss introduced by the transforming and quantizing of the residual data, the first reconstructed block may have distortion or artifacts. One common type of artifact or distortion is referred to as blockiness, where the boundaries of the blocks used to code the video data are visible.

To further improve the quality of decoded video, a video decoder can perform one or more filtering operations on the reconstructed video blocks. Examples of these filtering operations include deblocking filtering, sample adaptive offset (SAO) filtering, and adaptive loop filtering (ALF). Parameters for these filtering operations may either be determined by a video encoder and explicitly signaled in the encoded video bitstream or may be implicitly determined by a video decoder without needing the parameters to be explicitly signaled in the encoded video bitstream.

Some implementations of ALF utilize one or both of residual samples or reconstructed samples to determine a filter used at the ALF stage. ALF is generally performed after deblocking filtering and SAO filtering, while residual samples and reconstructed samples are determined before deblocking filtering and SAO filtering. Thus, in order to use the residual samples or reconstructed samples for ALF, the residual samples and reconstructed samples need to be buffered while deblocking filtering and SAO are performed. This buffering requires increased hardware complexity.

To reduce the amount of required buffering, this disclosure describes techniques to process residual data of a residual block to determine processed residual data and store the processed residual data rather than the residual data itself. The processed residual data may have less data, e.g., fewer bits, than the residual data and, thus, require less memory to buffer. In some examples, the processing may also modify the residual data, such that the residual data is more likely to result in a better filter being selected during ALF.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, unencoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may be or include any of a wide range of devices, such as desktop computers, notebook (i.e., laptop) computers, mobile devices, tablet computers, set-top boxes, telephone handsets such as smartphones, televisions, cameras, display devices, digital media players, video gaming consoles, video streaming device, broadcast receiver devices, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for preprocessing of input data for ALF. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than include an integrated display device.

System 100 as shown in FIG. 1 is merely one example. In general, any digital video encoding and/or decoding device may perform techniques for preprocessing of input data for ALF. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, source device 102 and destination device 116 may operate in a substantially symmetrical manner such that each of source device 102 and destination device 116 includes video encoding and decoding components. Hence, system 100 may support one-way or two-way video transmission between source device 102 and destination device 116, e.g., for video streaming, video playback, video broadcasting, or video telephony.

In general, video source 104 represents a source of video data (i.e., raw, unencoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although memory 106 and memory 120 are shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may demodulate the received transmission signal, according to a communication standard, such as a wireless communication protocol. The communication medium may include any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or nonvolatile memory, or any other suitable digital storage media for storing encoded video data.

In some examples, source device 102 may output encoded video data to file server 114 or another intermediate storage device that may store the encoded video data generated by source device 102. Destination device 116 may access stored video data from file server 114 via streaming or download.

File server 114 may be any type of server device capable of storing encoded video data and transmitting that encoded video data to the destination device 116. File server 114 may represent a web server (e.g., for a website), a server configured to provide a file transfer protocol service (such as File Transfer Protocol (FTP) or File Delivery over Unidirectional Transport (FLUTE) protocol), a content delivery network (CDN) device, a hypertext transfer protocol (HTTP) server, a Multimedia Broadcast Multicast Service (MBMS) or Enhanced MBMS (eMBMS) server, and/or a network attached storage (NAS) device. File server 114 may, additionally or alternatively, implement one or more HTTP streaming protocols, such as Dynamic Adaptive Streaming over HTTP (DASH), HTTP Live Streaming (HLS), Real Time Streaming Protocol (RTSP), HTTP Dynamic Streaming, or the like.

Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. Input interface 122 may be configured to operate according to any one or more of the various protocols discussed above for retrieving or receiving media data from file server 114, or other such protocols for retrieving media data.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 include wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 includes a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., a communication medium, storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream.

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may implement video encoder 200 and/or video decoder

300 in processing circuitry such as an integrated circuit and/or a microprocessor. Such a device may be a wireless communication device, such as a cellular telephone, or any other type of device described herein.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as ITU-T H.266, also referred to as Versatile Video Coding (VVC). In other examples, video encoder 200 and video decoder 300 may operate according to a proprietary video codec/format, such as AOMedia Video 1 (AV1), extensions of AV1, and/or successor versions of AV1 (e.g., AV2). In other examples, video encoder 200 and video decoder 300 may operate according to other proprietary formats or industry standards. The techniques of this disclosure, however, are not limited to any particular coding standard or format. In general, video encoder 200 and video decoder 300 may be configured to perform the techniques of this disclosure in conjunction with any video coding techniques that uses ALF.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to VVC. According to VVC, a video coder (such as video encoder 200) partitions a picture into a plurality of CTUs. Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to CUs.

In an MTT partitioning structure, blocks may be partitioned using a quadtree (QT) partition, a binary tree (BT) partition, and one or more types of triple tree (TT) (also called ternary tree (TT)) partitions. A triple or ternary tree partition is a partition where a block is split into three sub-blocks. In some examples, a triple or ternary tree partition divides a block into three sub-blocks without dividing the original block through the center. The partitioning types in MTT (e.g., QT, BT, and TT), may be symmetrical or asymmetrical.

When operating according to the AV1 codec, video encoder 200 and video decoder 300 may be configured to code video data in blocks. In AV1, the largest coding block that can be processed is called a superblock. In AV1, a superblock can be either 128×128 luma samples or 64×64 luma samples. However, in successor video coding formats (e.g., AV2), a superblock may be defined by different (e.g., larger) luma sample sizes. In some examples, a superblock is the top level of a block quadtree. Video encoder 200 may further partition a superblock into smaller coding blocks. Video encoder 200 may partition a superblock and other coding blocks into smaller blocks using square or non-square partitioning. Non-square blocks may include N/2×N, N×N/2, N/4×N, and N×N/4 blocks. Video encoder 200 and video decoder 300 may perform separate prediction and transform processes on each of the coding blocks.

AV1 also defines a tile of video data. A tile is a rectangular array of superblocks that may be coded independently of other tiles. That is, video encoder 200 and video decoder 300 may encode and decode, respectively, coding blocks within a tile without using video data from other tiles. However, video encoder 200 and video decoder 300 may perform filtering across tile boundaries. Tiles may be uniform or non-uniform in size. Tile-based coding may enable parallel processing and/or multi-threading for encoder and decoder implementations.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning, QTBT partitioning, MTT partitioning, superblock partitioning, or other partitioning structures.

In some examples, a CTU includes a coding tree block (CTB) of luma samples, two corresponding CTBs of chroma samples of a picture that has three sample arrays, or a CTB of samples of a monochrome picture or a picture that is coded using three separate color planes and syntax structures used to code the samples. A CTB may be an N×N block of samples for some value of N such that the division of a component into CTBs is a partitioning. A component is an array or single sample from one of the three arrays (luma and two chroma) that compose a picture in 4:2:0, 4:2:2, or 4:4:4 color format or the array or a single sample of the array that compose a picture in monochrome format. In some examples, a coding block is an M×N block of samples for some values of M and N such that a division of a CTB into coding blocks is a partitioning.

The blocks (e.g., CTUs or CUs) may be grouped in various ways in a picture. As one example, a brick may refer to a rectangular region of CTU rows within a particular tile in a picture. A tile may be a rectangular region of CTUs within a particular tile column and a particular tile row in a picture. A tile column refers to a rectangular region of CTUS having a height equal to the height of the picture and a width specified by syntax elements (e.g., such as in a picture parameter set). A tile row refers to a rectangular region of CTUs having a height specified by syntax elements (e.g., such as in a picture parameter set) and a width equal to the width of the picture.

In some examples, a tile may be partitioned into multiple bricks, each of which may include one or more CTU rows within the tile. A tile that is not partitioned into multiple bricks may also be referred to as a brick. However, a brick that is a true subset of a tile may not be referred to as a tile. The bricks in a picture may also be arranged in a slice. A slice may be an integer number of bricks of a picture that may be exclusively contained in a single network abstraction layer (NAL) unit. In some examples, a slice includes either a number of complete tiles or only a consecutive sequence of complete bricks of one tile.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may include N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

AV1 includes two general techniques for encoding and decoding a coding block of video data. The two general techniques are intra prediction (e.g., intra frame prediction or spatial prediction) and inter prediction (e.g., inter frame prediction or temporal prediction). In the context of AV1, when predicting blocks of a current frame of video data using an intra prediction mode, video encoder 200 and video decoder 300 do not use video data from other frames of video data. For most intra prediction modes, video encoder 200 encodes blocks of a current frame based on the difference between sample values in the current block and predicted values generated from reference samples in the same frame. Video encoder 200 determines predicted values generated from the reference samples based on the intra prediction mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the transform coefficients, providing further compression. By performing the quantization process, video encoder 200 may reduce the bit depth associated with some or all of the transform coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) transform coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information for partitioning of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

In video coding, such as in the H.266/VVC standard, ALF is applied to minimize the mean square error between filtered samples and original samples. ALF, as implemented in H.266/VVC, utilizes only samples after SAO filtering. That is, the input samples for ALF may, for example, be the output samples of SAO. The output samples of ALF may be stored in decoded picture buffer (DPB) or output as viewable pictures. The filter shapes for ALF that were adopted in the joint exploration model (JEM) software were 5×5, 7×7, and 9×9 diamond shapes. The filter shape can be selected and signaled at a picture level in JEM. To get a better trade-off between coding efficiency and filter complexity, in VVC, only 7×7 diamond shape and 5×5 diamond shape are supported for luma and chroma components, respectively.

Figure 2B:
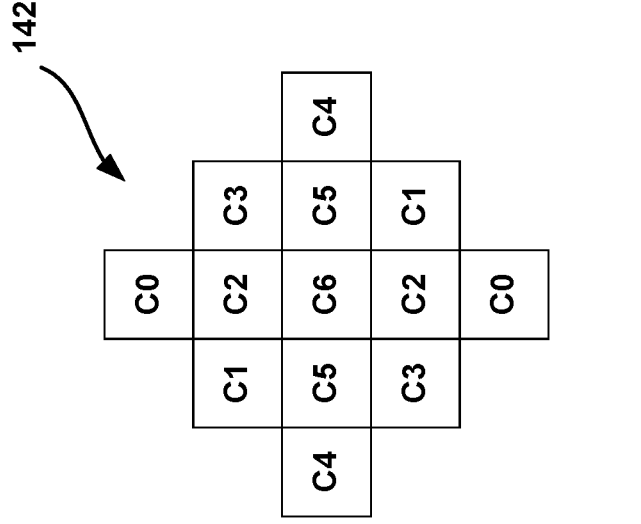
FIGS. 2A and 2B are conceptual diagram illustrating example adaptive loop filter (ALF) shapes that may be used in accordance with the techniques of this disclosure.
Figure 2A:
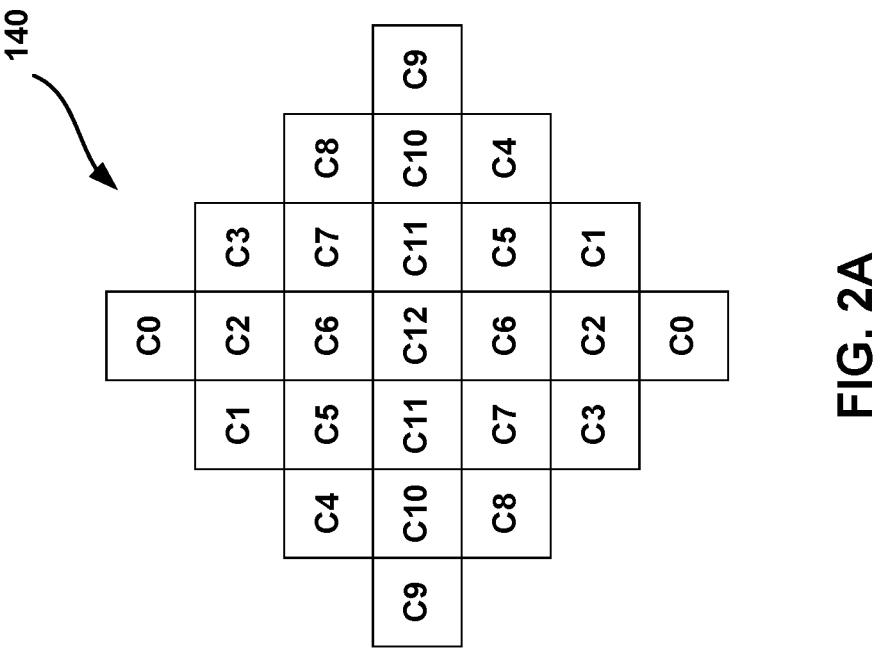

FIG. 2A shows an example filter 140, which is a 7×7 diamond shape filter. FIG. 2B shows an example filter 142, which is a 5×5 diamond shape filter. In each of filters 140 and 142, an integer coefficient $c_i$ is represented with 7-bit fractional precision. The absolute value of $c_i$ is coded by using a $0^{th}$ order Exp-Golomb code followed by a sign bit for a non-zero coefficient. In FIGS. 2A and 2B, each square corresponds to a luma or chroma sample, and the center square corresponds a current to-be-filtered sample. To reduce the overhead of sending coefficients and the number of multiplications, the filter shapes in FIGS. 2A and 2B are point-symmetrical. In addition, as shown in equation (1), the sum of all filter coefficients is set equal to 128, which is the fixed-point representation of 1.0 with 7-bit fractional precision.

$$2\sum_{i=0}^{N-2} c_i + c_{N-1} = 128 \tag{1}$$

In equation (1), N is the number of coefficients, with N being equal to 13 and 7 for 7×7 and 5×5 filter shapes, respectively.

In VVC, nonlinearity is introduced to ALF. A simple clipping function is applied to reduce the impact of a neighboring sample value when the difference between the neighboring sample value and a current to-be-filtered sample value is too large. To filter a sample, ALF may be performed as:

$$\tilde{R}(x, y) = R(x, y) + \left[\sum_{i=0}^{N-2} c_i(f_{i,0} + f_{i,1}) + 64\right] \gg 7 \tag{2}$$

where R(x, y) is a sample value after SAO.

The non-linear function is defined with a clipping functions as:

$$f_{i,j} = \min(b_i, \max(-b_i, R(x + x_{i,j}, y + y_{i,j}) - R(x, y))) \tag{3}$$

where j is equal to 0 or 1, and $(x_{i,j}, y_{i,j})$ are filter tap position offsets of ith coefficient $c_i$.

In VVC version 1, as shown in equation (4), the clipping parameter $b_i$ for a coefficient $c_i$, is determined by a clipping index di. BD is the internal bit depth.

$$b_i = \begin{cases} 2^{BD}, & \text{when } d_i = 0 \\ 2^{BD-1-2d_i}, & \text{otherwise} \end{cases} \tag{4}$$

For a filter, both the number of signaled coefficients and the number of the signaled clipping index are N−1. Each coefficient is limited to the range of [−128, 127], which is equivalent to [−1.0, 1.0] with 7-bit fractional precision. Each clipping index $d_i$ can be 0, 1, 2 or 3 and is signaled by using a two-bit fixed length code. To simplify the clipping operation, as in equation (4), the value of a clipping parameter $b_i$ may be limited to only be a power of 2. Therefore, bit-wise logical operations can be applied as clipping operations.

Figure 3:
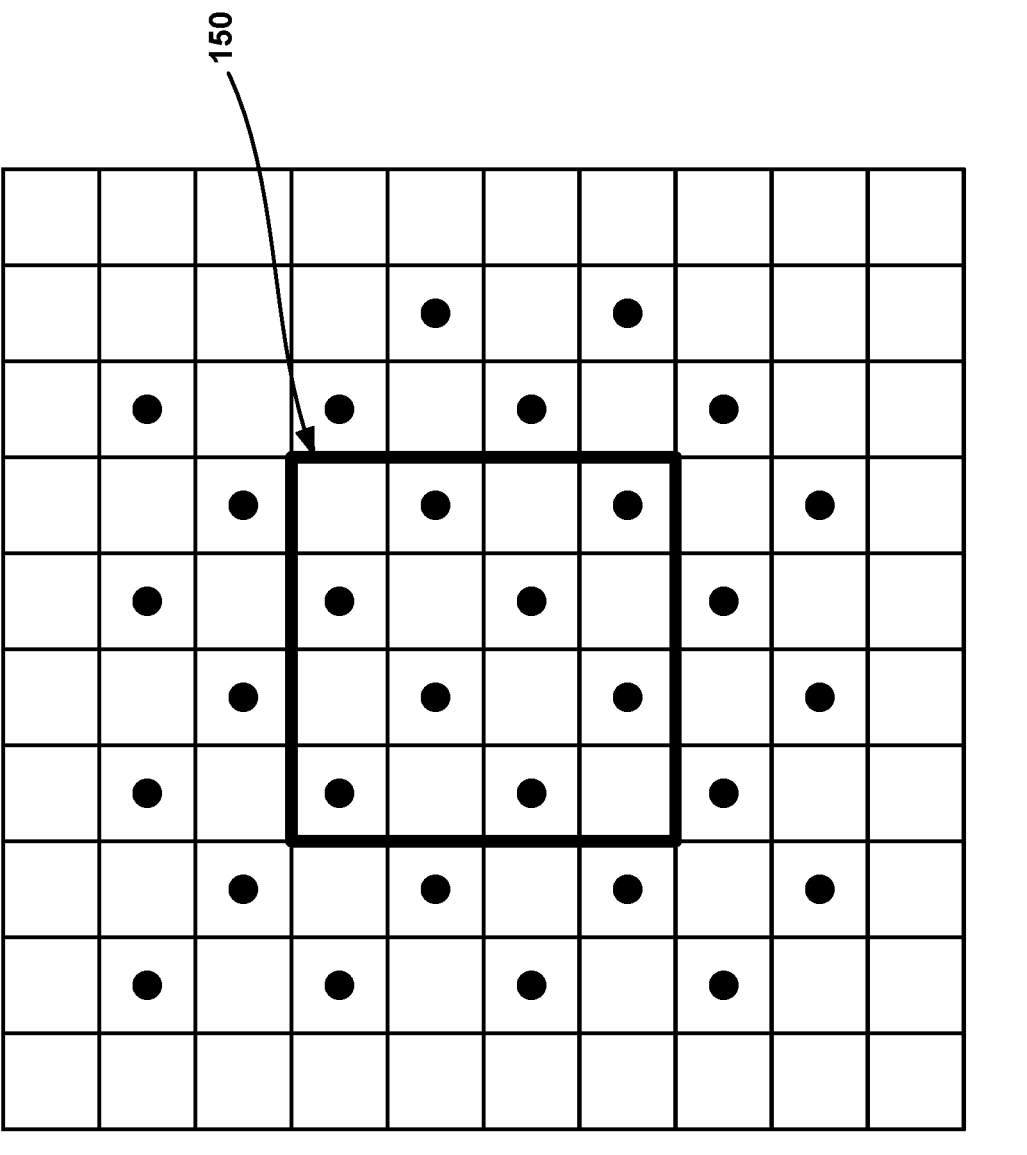
FIG. 3 is a conceptual diagram illustrating example sub-sampled Laplacian values for a 4×4 sub-block ALF classification that may be used in accordance with the techniques of this disclosure.

Video encoder 200 and video decoder 300 may be configured to perform sub-block level filter adaptation. In VVC version 1, ALF follows the same luma classification framework as ALF in JEM-7.0. To obtain a better trade-off between coding efficiency and calculation complexity, the block size for classification may be increased to 4×4 samples from 2×2 samples. To determine the class index of a 4×4 block, a surrounding window with 8×8 luma samples is employed to derive direction and activity information. In this 8×8 luma samples window, four gradient values of every second sample are first calculated, as shown in FIG. 3. FIG. 3 illustrates subsampled Laplacian values for a 4×4 sub-block 150 for ALF classification. Gradient values of samples marked with a dot are calculated. Gradient values of other samples are set to 0.

Figure 4:
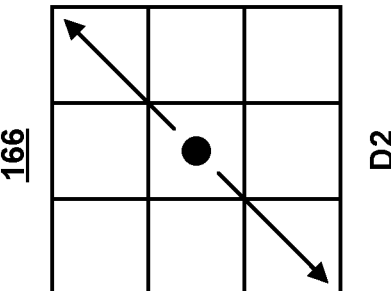
FIG. 4 is a conceptual diagram illustrating example Laplacian values for a luma sample that may be used in accordance with the techniques of this disclosure.
Figure 4:
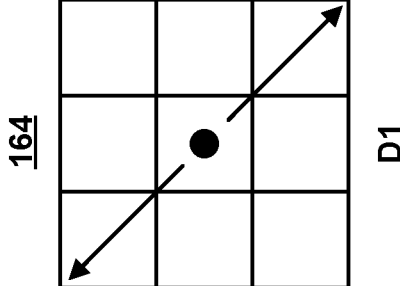
Figure 4:
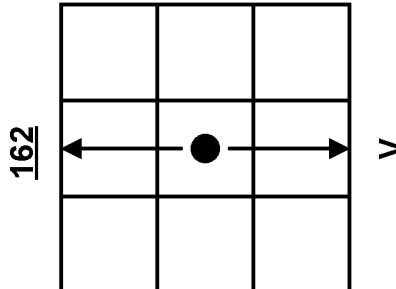
Figure 4:
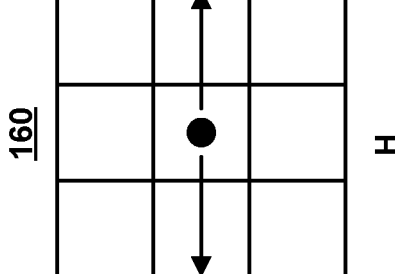

FIG. 4 illustrates the four gradient values for each sample with coordinates (k, l). The dot represents the sample for which the gradient is being calculated. Block 160 illustrates the horizontal gradient (H), and block 162 illustrates the vertical gradient (V). Block 164 illustrates the 135-degree gradient (D1), and block 166 illustrates the 45-degree gradient (D2). H, V, D1, and D2 are derived as follows:

$$H_{k,l} = |2R(k, l) - R(k - 1, l) - R(k + 1, l)| \tag{5}$$

$$V_{k,l} = |2R(k, l) - R(k, l - 1) - R(k, l + 1)|$$

$$D1_{k,l} = |2R(k, l) - R(k - 1, l - 1) - R(k + 1, l + 1)|$$

$$D2_{k,l} = |2R(k, l) - R(k - 1, l + 1) - R(k + 1, l - 1)|$$

Variables i and j can refer to the coordinates of the upper left sample in the 4×4 block. The summation of the calculated horizontal gradient $g_H$, the vertical gradient $g_v$, the 135-degree gradient $g_{D1}$, and the 45-degree gradient $g_{D2}$ is calculated as follows:

$$g_H = \sum_{k=i-2}^{i+5} \sum_{l=j-2}^{j+5} H_{k,l}, \; g_V = \sum_{k=i-2}^{i+5} \sum_{l=j-2}^{j+5} V_{k,l} \tag{6}$$

$$g_{D1} = \sum_{k=i-2}^{i+5} \sum_{l=j-2}^{j+5} D1_{k,l}, \; g_{D2} = \sum_{k=i-2}^{i+5} \sum_{l=j-2}^{j+5} D2_{k,l}$$

A ratio of the maximum and minimum of the horizontal and vertical gradients, denoted by $R_{H,V}$, and the ratio of maximum and minimum of the two diagonal gradients, denoted by $R_{D1,D2}$, are calculated as shown in equation (7).

$$R_{H,V} = \max(g_H, g_V)/\min(g_H, g_V) \tag{7}$$

$$R_{D1,D2} = \max(g_{D1}, g_{D2})/\min(g_{D1}, g_{D2})$$

Then, $R_{H,V}$ and $R_{D1,D2}$ are compared to each other with two thresholds $t_1=2$ and $t_2=4.5$ to derive the directionality D:

Step 1: If both $R_{H,V} \le t_1$ and $R_{D1,D2} \le t_1$, D is set to 0 (texture), otherwise continue with Step 2.

Step 2: If $R_{D1,D2} > R_{H,V}$, continue with Step 3, otherwise continue with Step 4.

Step 3: If $R_{D1,D2} \le t_2$, D is set to 1 (weak diagonal), otherwise, D is set to 2 (strong diagonal).

Step 4: If $R_{H,V} \le t_2$, D is set to 3 (weak horizontal/vertical), otherwise, D is set to 4 (strong horizontal/vertical).

The activity value A is calculated as follows:

$$A = \left( \sum_{k=i-2}^{i+5} \sum_{l=j-2}^{j+5} (V_{k,l} + H_{k,l}) \right) \gg (BD - 2) \tag{8}$$

Figure 5:
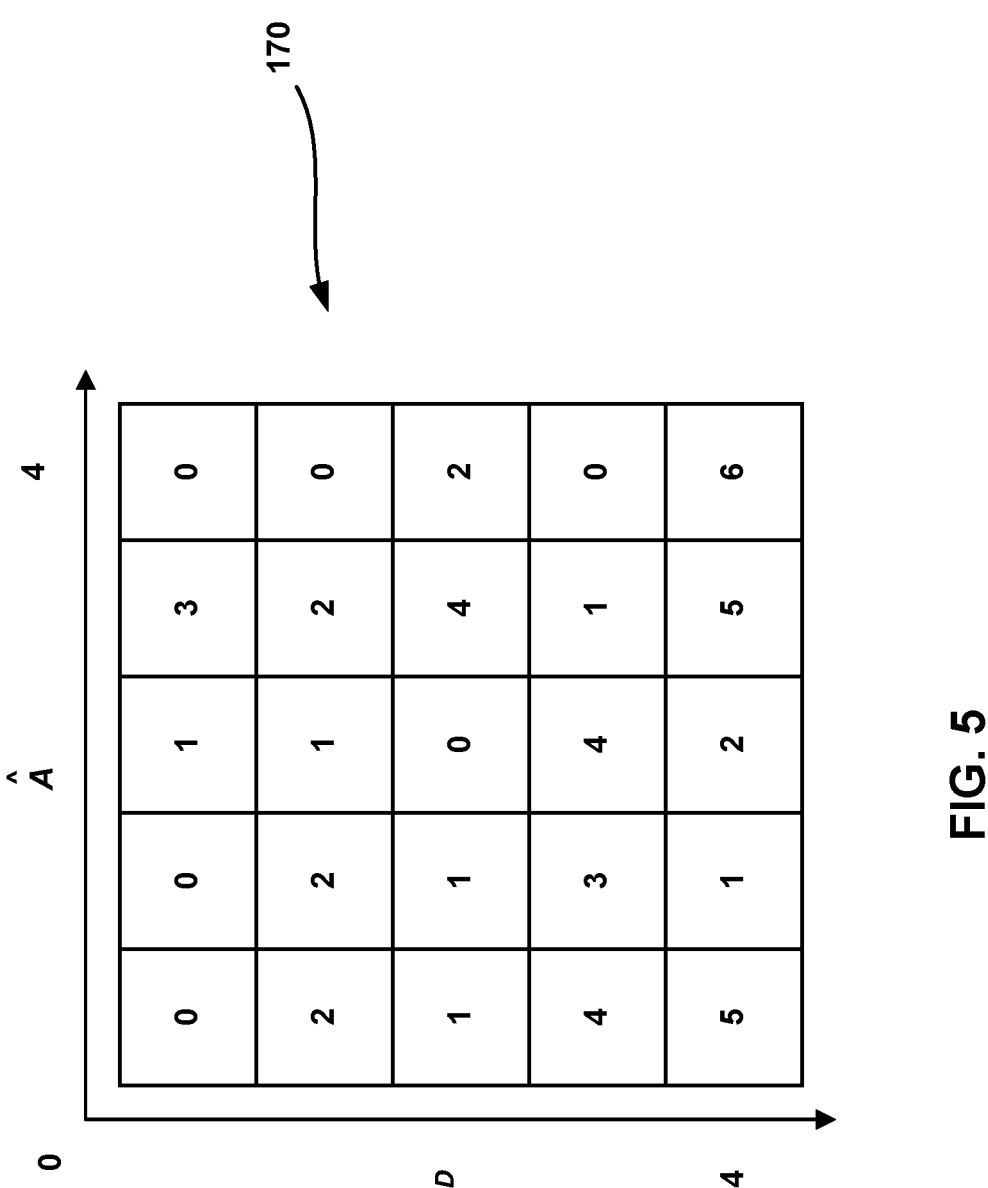
FIG. 5 is a conceptual diagram illustrating an example of ALF class merging that may be used in accordance with the techniques of this disclosure.

FIG. 5 shows an example of merging 25 luma classes into 7 merged classes (0 to 6), where each square represents a class based on the values of D and Â. 5×5 grid 170 represents the 25 classes, with the numbers inside each box of 5×5 grid 170 representing the merged class from 0 to 6. Each class, i.e., each square in 5×5 grid 170, can have an index from 0 to 24 inclusive. A is mapped to the range of 0 to 4 inclusive, and the quantized value is denoted as Â. Therefore, each 4×4 block is categorized into one of the 25 classes as follows:

$$C = 5D + \hat{A} \tag{9}$$

A luma filter set contains 25 filters. However, to reduce the number of bits required to represent the filter coefficients while maintaining the coding efficiency, different classes can be merged, with the merged classes using the same filters. A merging table is signaled. In the merging table, a filter index for each class is signaled, for example, using a fixed-length code. In the example filter set for FIG. 5, 7 luma filters are signaled. For each class, the filter index (from 0 to 6 in this example) is signaled in an ALF_APS.

After determining a filter from a luma filter set based on class index C of a 4×4 block and the merging table, before filtering the samples of the 4×4 block, a geometric transformation may be applied to the filter depending on gradient values calculated for the 4×4 block as illustrated in Table 1.

TABLE 2

Geometric transformation based on gradient values

| Gradient values | Transformation |
|---|---|
| $g_{D2} < g_{D1}$ and $g_H < g_V$ | No transformation |
| $g_{D2} < g_{D1}$ and $g_V \le g_H$ | Diagonal flip |
| $g_{D1} \le g_{D2}$ and $g_H < g_V$ | Vertical flip |
| $g_{D1} \le g_{D2}$ and $g_V \le g_H$ | Right rotation |

Figure 6:
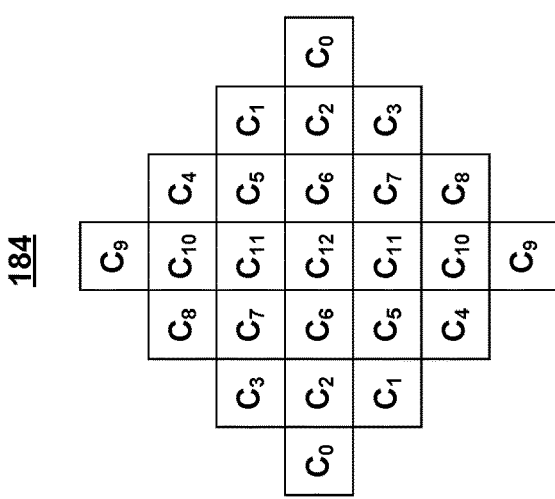
FIG. 6 is a conceptual diagram illustrating example geometric transformations of 7×7 diamond filter shapes that may be used in accordance with the techniques of this disclosure.
Figure 6:
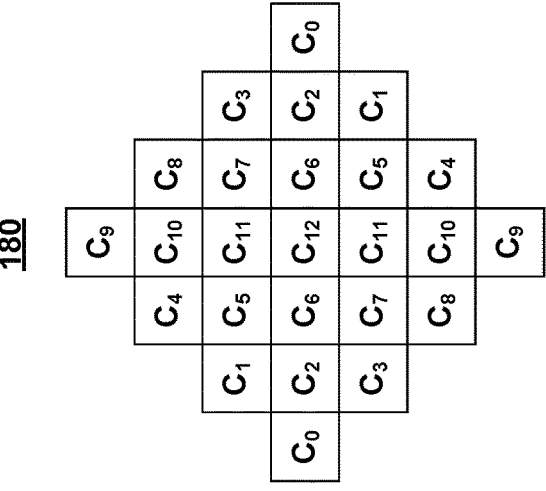

FIG. 6 shows examples of geometric transformations of filter 140 in FIG. 2A. As can be seen in FIG. 6, filter 180 corresponds to a diagonal flip of filter 140. Filter 182 corresponds to a vertical flip of filter 140, and filter 184 corresponds to a right rotation of filter 140.

Video encoder 200 and video decoder 300 may be configured to perform coding tree block level adaptation. In JEM-7.0, only one luma filter set is applied to all luma CTBs of a slice, and only one chroma filter is applied to all chroma CTBs of a slice. However, there are two potential disadvantages. First, when statistic information among CTBs differs by a certain amount, using the same filter or filter set for all CTBs of a color component may limit the coding efficiency of ALF, especially for large-resolution sequences and mixed-content video sequences. Second, when deriving a filter for a slice, a filter cannot be calculated until the statistic information of the entire slice is collected. This multiple-pass coding is not friendly for low-delay applications. To address this problem, one solution is to use statistics from previous coded slices. However, this may result in some performance loss.

In addition to luma 4×4 block level filter adaptation, VVC supports CTB level filter adaption. In a slice, different luma CTBs are allowed to use different luma filter sets, and different chroma CTBs are able to use different chroma filters. CTBs with similar statistics may use the same filters. This CTB level filter adaptation improves coding efficiency, especially for low-delay applications. Additionally, VVC version 1 allows filters from previously coded pictures to be used for CTBs. This temporal filter re-usage mechanism can reduce the overhead of filter coefficient signaling. In VVC version 1, up to seven signaled luma filter sets and eight signaled chroma filters can be applied to a slice. When there are not any signaled filters, one of 16 fixed filter sets can be applied to a luma CTB. When ALF is enabled, the filter set index of either a fixed filter set or a signaled luma filter set is signaled for a luma CTB. The filter index of a signaled chroma filter is signaled for a chroma CTB. By using filters signaled from previously coded pictures and fixed filters, when encoding a current CTU in a low delay application, three CTU-level on/off flags and a filter/filter set index can be determined by only using the statistic information of a current CTU. Therefore, the encoded bitstream of each CTU can be generated on the fly and without waiting for the availability of the statistics of the whole picture.

Video encoder 200 and video decoder 300 may be configured to perform techniques for line buffer reduction. As shown in FIGS. 2A and 2B, in the vertical direction, the filter shapes have 7 taps and 5 taps for luma and chroma components, respectively. As a result, in VVC Test Model 2.0 (VTM-2.0), when decoding a row of CTUs, due to the delay of the deblocking filter and SAO filter, 7 luma lines and 4 chroma lines of the upper CTU row must be stored in a line buffer for ALF. However, the extra line buffers require large chip areas, especially for high-definition (HD) and ultra-high-definition (UHD) video sequences.

To make ALF hardware friendly (e.g., by reducing line buffer requirements), the concept of a virtual boundary (VB) may be applied to remove all the line buffer overhead for ALF. Considering the deblocking filter and SAO filter in VVC version 1, the position of a VB is 4 luma samples and 2 chroma samples above a horizontal CTU boundary. When one sample on one side of a VB is filtered, the samples on the other side of the VB cannot be utilized, and modified filtering with symmetrical sample padding may be applied.

Figure 7A:
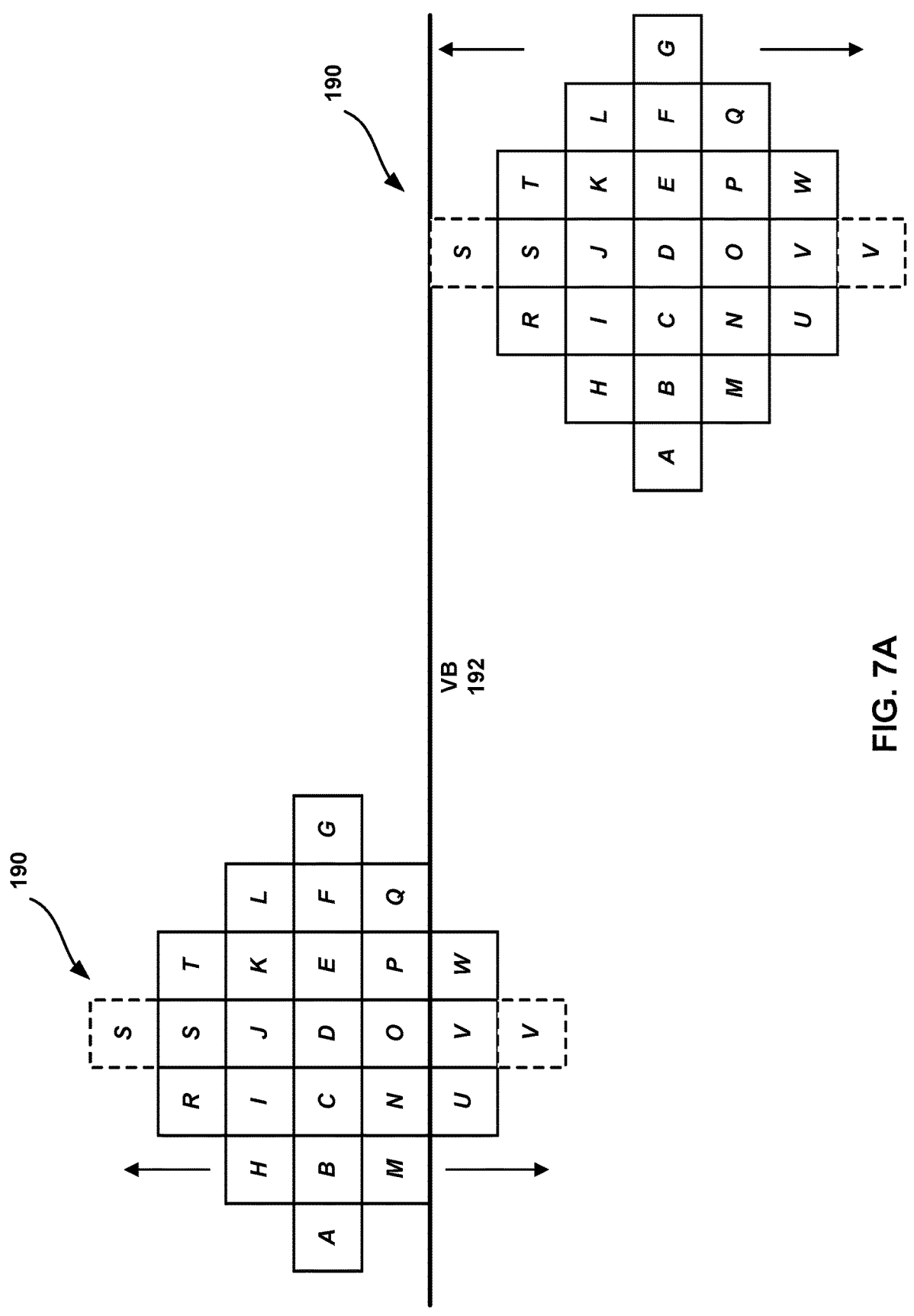
FIGS. 7A-7C show examples of symmetrical sample padding in ALF that may be used in accordance with the techniques of this disclosure.
Figure 7B:
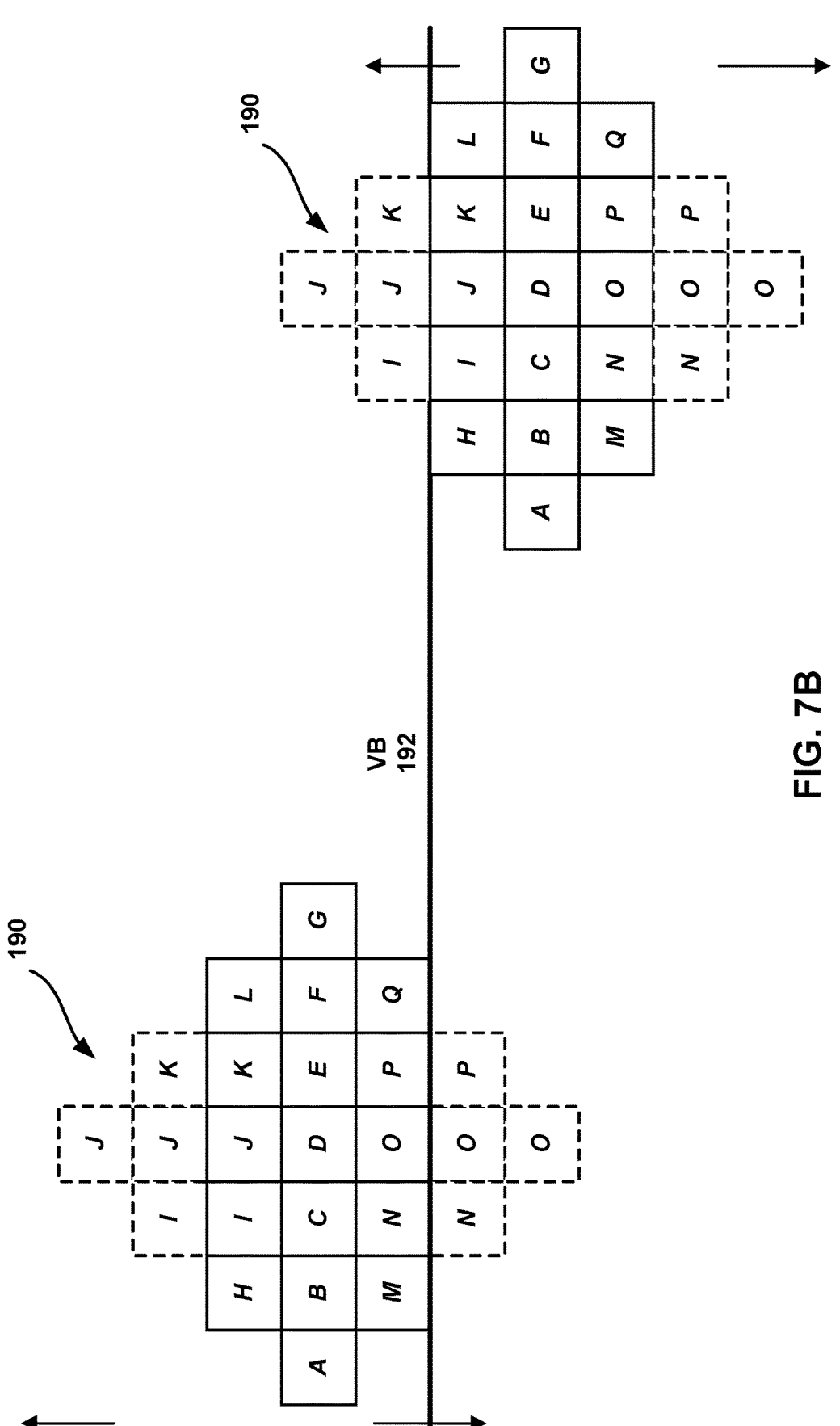
Figure 7C:
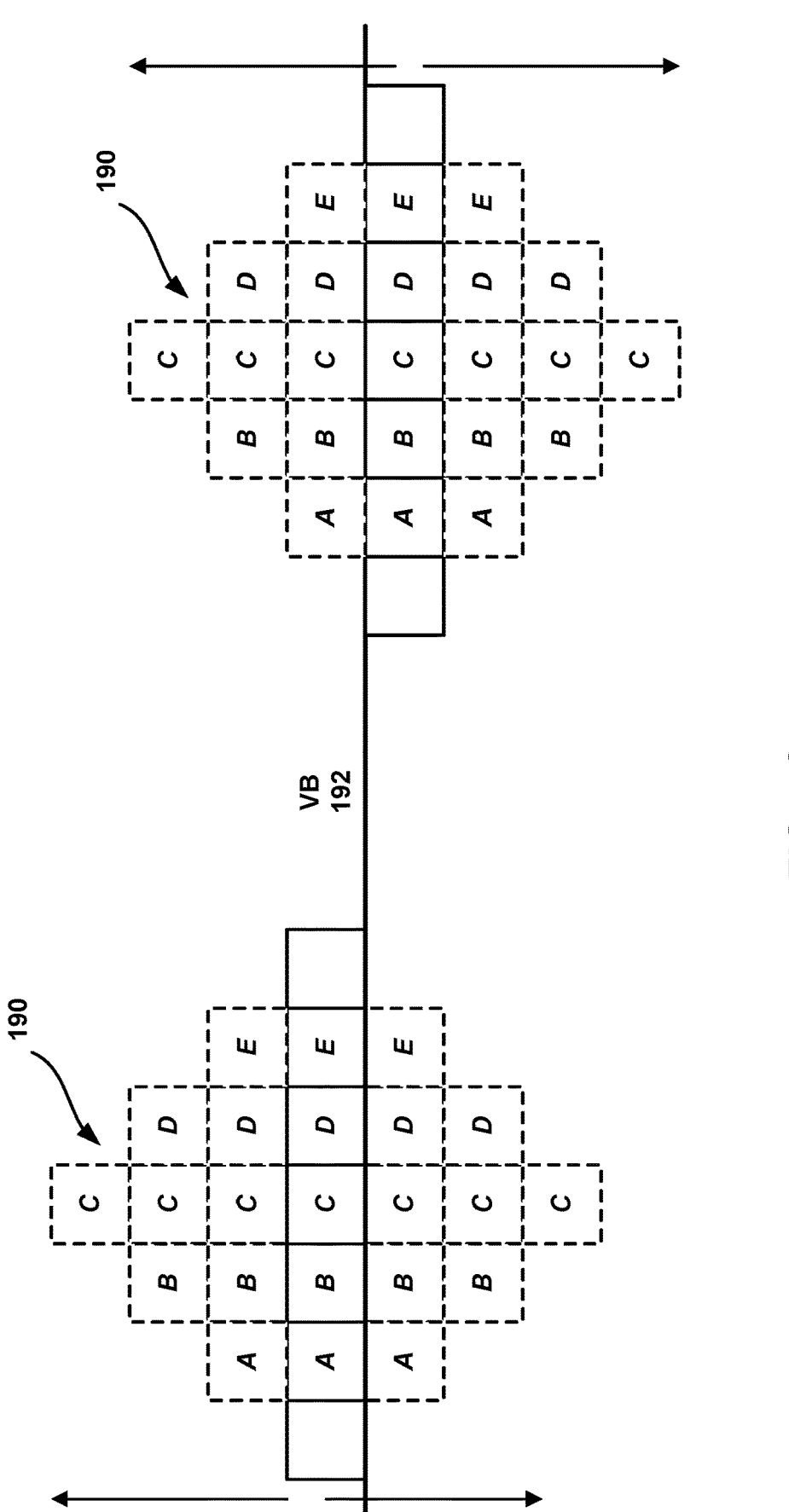

FIGS. 7A-7C show examples of symmetrical sample padding for luma ALF filtering at an ALF VB. In the examples of FIGS. 7A-7C, the center square of filter 190 is the position of a current, to-be-filtered sample, and the bold line is the position of a VB (VB 192). In FIGS. 7A-7C, the filter tap locations with dashed lines are padded. FIG. 7A shows an example where one filter tap location of filter 190 is above or below VB 192. In this example, one filter tap location is padded. FIG. 7B shows an example where four filter tap locations of filter 190 are above or below VB 192. In this example, four filter tap locations are padded.

However, when a sample is on the closest row on each side of VB 192, as shown in FIG. 7C, the 2D filter is equivalent to a horizontal filter. This may introduce visual artifacts. To address this problem, the filter strength may be compensated when the current, to-be-filtered sample is located on the closest row on each side of a VB, as shown in equation (10). Comparing equation (10) with equation (2), it can be seen that 3 more bits are right shifted.

$$\tilde{R}(x,\ y) = R(x,\ y) + \left[ \sum_{i=0}^{N-2} c_i(f_{i,0} + f_{i,1}) + 512 \right] \gg 10 \qquad (10)$$

When VB processing is applied, the classification of a 4×4 block may also be modified. When calculating the class index of a 4×4 block on one side of a VB, the gradients and samples on the other side of the VB may not be used, as shown in FIG. 8.

Figure 8:
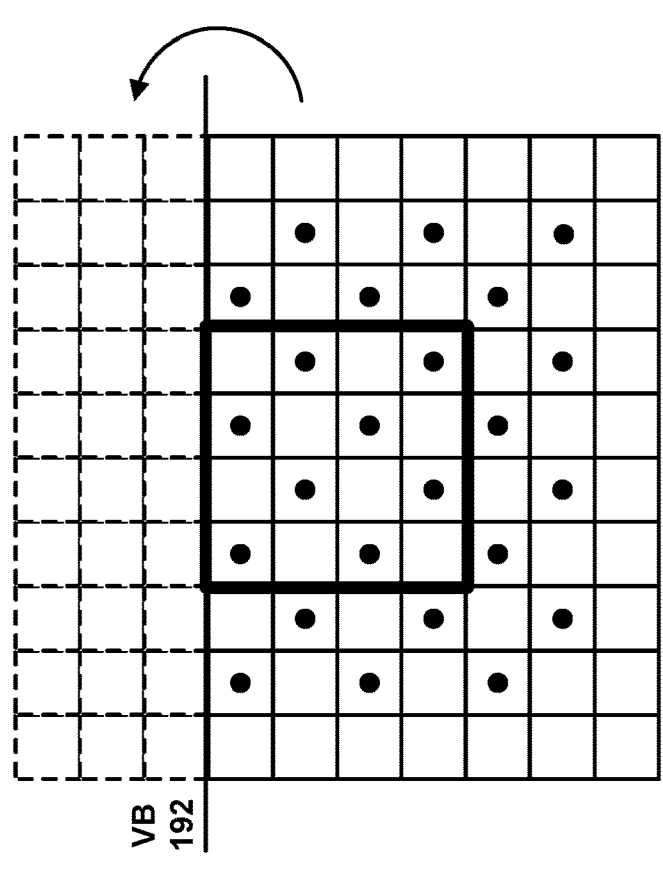
FIG. 8 shows an example of ALF 4×4 sub-block classification that may be used in accordance with the techniques of this disclosure.
Figure 8:
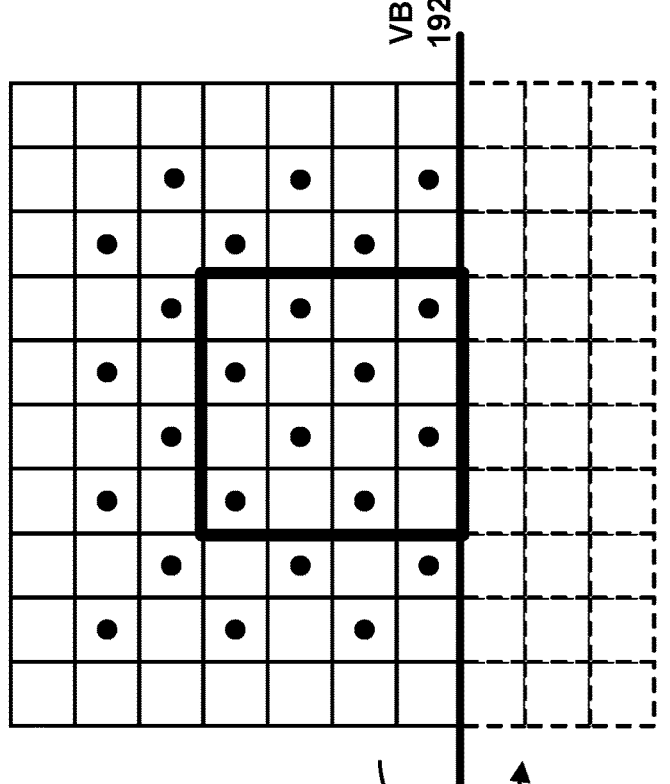

FIG. 8 shows an example of ALF 4×4 sub-block classification at an ALF VB. When calculating gradient values of samples adjacent to a VB, the samples on the other side of the VB cannot be utilized. Therefore, the boundary samples of the current side are repetitively extended, as shown in FIG. 8. That is, the boundary samples on the current side of the VB are mirrored to the other side of the VB. As the number of available gradient values is reduced, the activity derivation in equation (8) is re-scaled to:

$$A = \left( \sum_{k=i-2}^{i+5} \sum_{l=j-2}^{j+5} (V_{k,l} + H_{k,l}) * 3 \right) \gg (BD - 1) \qquad (11)$$

Video encoder 200 and video decoder 300 may be configured to perform filter coefficient signaling. In VVC version 1, ALF coefficients are signaled in ALF adaptation parameter sets (APS). One APS may contain one set of luma filters with up to 25 filters, up to 8 chroma filters and up to 8 cross-component ALF (CC-ALF) filters. Each set of luma filters support applying ALF to the luma 25 classes. In VVC version 1, up to 8 ALF_APSs are supported.

Table 2 below shows an example syntax signal table for signaling filter coefficients in accordance with the techniques of this disclosure.

TABLE 2

|  | Descriptor |
|---|---|
| alf_data( ) { | |
|   alf_luma_filter_signal_flag | u(1) |
|   if( aps_chroma_present_flag ) { | |
|     alf_chroma_filter_signal_flag | u(1) |
|     alf_cc_cb_filter_signal_flag | u(1) |
|     alf_cc_cr_filter_signal_flag | u(1) |
|   } | |
|   if( alf_luma_filter_signal_flag ) { | |
|     alf_luma_clip_flag | u(1) |
|     alf_luma_num_filters_signalled_minus1 | ue(v) |
|     if( alf_luma_num_filters_signalled_minus1 > 0) | |
|       for( filtIdx = 0; filtIdx < NumAlfFilters; filtIdx++ ) | |
|         alf_luma_coeff_delta_idx[ filtIdx ] | u(v) |
|     for( sfIdx = 0; sfIdx <= alf_luma_num_filters_signalled_minus1; sfIdx++ | |
|   ) | |
|       for( j = 0; j < 12; j++ ) { | |
|         alf_luma_coeff_abs[ sfIdx ][ j ] | ue(v) |
|         if( alf_luma_coeff_abs[ sfIdx ][ j ] ) | |

TABLE 2-continued

| | Descriptor |
|---|---|
|         alf_luma_coeff_sign[ sfIdx ][ j ] | u(1) |
|       } | |
|   if( alf_luma_clip_flag ) | |
|     for( sfIdx = 0; sfIdx <= alf_luma_num_filters_signalled_minus1; | |
| sfIdx++ ) | |
|       for(j = 0; j < 12; j++ ) | |
|         alf_luma_clip_idx[ sfIdx ][ j ] | u(2) |
|   } | |
|   if( alf_chroma_filter_signal_flag ) { | |
|     alf_chroma_clip_flag | u(1) |
|     alf_chroma_num_alt_filters_minus1 | ue(v) |
|     for( altIdx = 0; altIdx <= alf_chroma_num_alt_filters_minus1; altIdx++ ) | |
| { | |
|       for( j = 0; j < 6; j++ ) { | |
|         alf_chroma_coeff_abs[ altIdx ][ j ] | ue(v) |
|         if( alf_chroma_coeff_abs[ altIdx ][ j ] > 0 ) | |
|           alf_chroma_coeff_sign[ altIdx ][ j ] | u(1) |
|       } | |
|       if( alf_chroma_clip_flag ) | |
|         for( j = 0; j < 6; j++ ) | |
|           alf_chroma_clip_idx[ altIdx ][ j ] | u(2) |
|     } | |
|   } | |
|   if( alf_cc_cb_filter_signal_flag ) { | |
|     alf_cc_cb_filters_signalled_minus1 | ue(v) |
|     for( k = 0; k < alf_cc_cb_filters_signalled_minus1 + 1; k++ ) { | |
|       for( j = 0; j < 7; j++ ) { | |
|         alf_cc_cb_mapped_coeff_abs[ k ][ j ] | u(3) |
|         if( alf_cc_cb_mapped_coeff_abs[ k ][ j ] ) | |
|           alf_cc_cb_coeff_sign[ k ][ j ] | u(1) |
|       } | |
|     } | |
|   } | |
|   if( alf_cc_cr_filter_signal_flag ) { | |
|     alf_cc_cr_filters_signalled_minus1 | ue(v) |
|     for( k = 0; k < alf_cc_cr_filters_signalled_minus1 + 1; k++ ) { | |
|       for( j = 0; j < 7; j++ ) { | |
|         alf_cc_cr_mapped_coeff_abs[ k ][ j ] | u(3) |
|         if( alf_cc_cr_mapped_coeff_abs[ k ][ j ] ) | |
|           alf_cc_cr_coeff_sign[ k ][ j ] | u(1) |
|       } | |
|     } | |
|   } | |
| } | |

Figure 9:
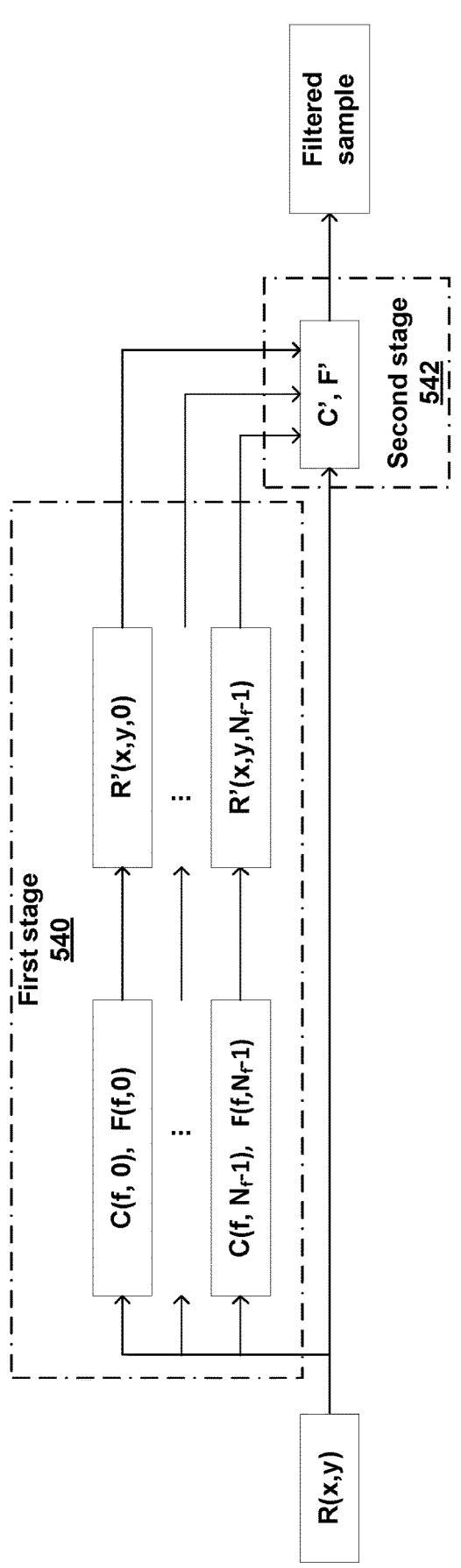
FIG. 9. shows and example ALF framework that uses multiple classifiers.

Video encoder 200 and video decoder 300 may be configured to perform ALF using multiple classifiers. In VVC, when filtering a sample, only one classifier and one filter can be applied. To improve ALF's performance on top of VVC, an ALF framework based on multiple classifiers has been proposed. An example implementation of such framework is shown in FIG. 9. When filtering a sample, as shown in FIG. 9, multiple classifiers are applied. A filter is applied to the sample corresponding to a classifier. In FIG. 9, there are two stages. First (first stage 540), a pre-filtering stage includes filter set F(f, i) with i=0 . . . . $N_f$–1 and the classifier C(f, i) with i=0 . . . . $N_f$–1 of the ith fixed filter set. Secondly (second stage 542), a final-filtering stages includes a signaled filter or a predefined filter set F', and the corresponding classifier C'.

Figure 10:
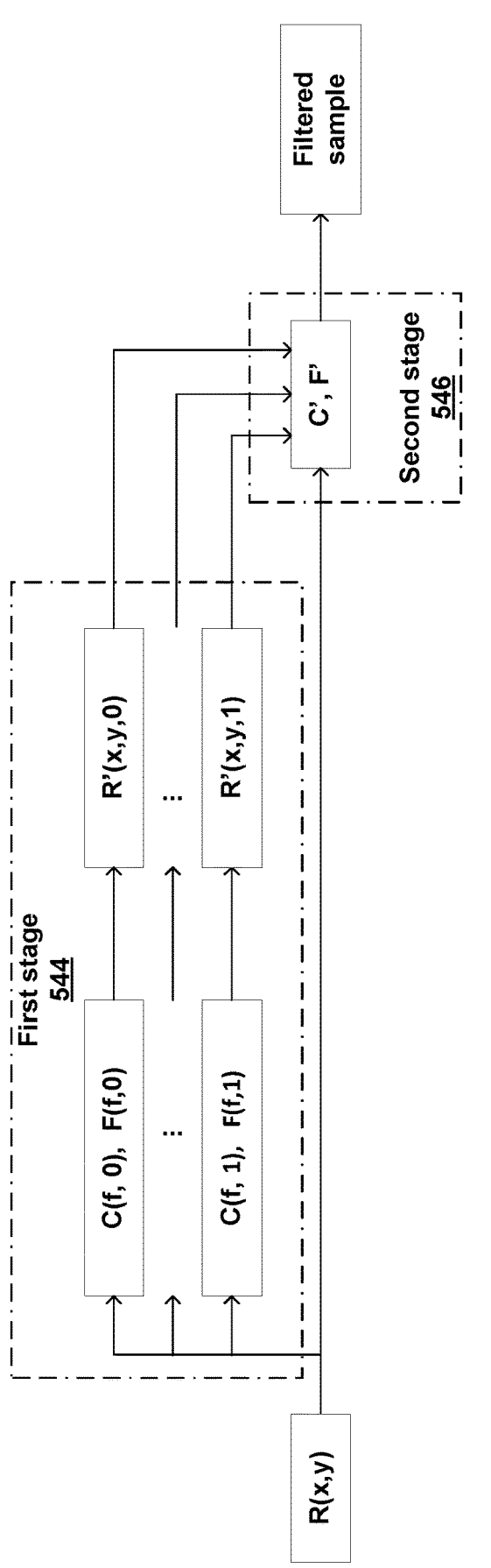
FIG. 10. shows an example ALF framework with three classifiers.

FIG. 10 shows an example ALF framework with three classifiers. In this regard, the ALF framework of FIG. 10 represents a specific implementation of the generalized ALF framework described with respect to FIG. 9. In the example of FIG. 10, which is adopted in ECM-1.0, $N_f$=2. In FIG. 10, there are two stages. First (first stage 544), a pre-filtering stage includes filter set F(f, i) with i=0 . . . . $N_f$–1 and the classifier C(f, i) with i=0 . . . . $N_f$–1 of the ith fixed filter set. Secondly (second stage 546), a final-filtering stages includes a signaled filter or a predefined filter set F', and the corresponding classifier C'.

In ECM-1.0, in a classifier C(f, i) with i=0 or 1, activity and direction values maybe determined based on 2-D Laplacian values. The classifier may be applied to each sample or a block. When a classifier is applied to a block, all samples in the block have the same class index and the same transpose type. Let $w_i$ denote the width of a block, $h_i$ denote height of the block and (x, y) denote the coordinates of the top-left sample of the block.

Similar to as in VVC, video decoder 300 may be configured to derive the activity value $A_i$ and directionality value $D_i$ by using vertical and horizontal gradients.

$A_i$ may be further quantized to the range of 0 to $M_{A,i}$–1 inclusively, with the quantized value denoted as $\hat{A}_i$. The of value $D_i$ may be in the range of 0 to $M_{D,i}$–1, inclusive.

Video decoder 300 may derive the class index $C_i$ as $C_i = \hat{A}_i * M_{D,i} + D_i$. Based on $C_i$, video decoder 300 may select a filter from C(f, i).

In the second stage, F' is a signaled filter or a predefined filter set, and C' is the corresponding classifier. The intermediate filtered results may be further filtered with current sample and/or neighbors. C' may be used to determine which filter in F' is applied and how to transpose the coefficients.

C' may use the R and/or R' to determine the filter index for filter set F' by calculating activity and directions as the first stage. Transpose may be applied when applying F'.

In ECM-7.0, a two-classifier based classification is applied to each 2×2 block to choose a filter from a signaled filter set as proposed in U.S. patent application Ser. No. 17/853,274, filed Jun. 29, 2022. For each 2×2 block, a Laplacian-based or a band-based classifier is applied to a CTB. The selection is signaled for each filter set in APS. The classifiers are applied to input to ALF.

When the Laplacian-based process is applied, as in VVC, video decoder 300 may derive the activity value A by using vertical and horizontal gradients. Then A is further quantized to the range of 0 to $M_A-1$, inclusive, and the quantized value is denoted as Â. Video decoder 300 may derive a directionality value D with the range of 0 to $M_D-1$ based on using vertical and horizontal gradients.

Then class index $C'=\hat{A}*M_D+D$.

When the band-based process is applied with N classes, the dynamic range of the value (for example, the value of a sample or the sum of sample values of a block) may be divided into N non-overlapped intervals, uniformly or non-uniformly. When classifying a sample or a block, video decoder 300 may derive the value of a sample or the sum of sample values of a block. Then the interval index of the sample value or the sum may be used as the class index. For example, when the dynamic range of sum of a block is uniformly partitioned into N intervals, the class index may be derived as $$(\text{sum}*N)>>\{\text{bitdepth}+[\log 2(\text{num of samples in the block})]\}$$

whereas bitdepth is the bit depth of a sample value.

After determining the class index of a sample from C', video decoder 300 may select a filter from the filter set F' based on the class index. Video decoder 300 may apply the filter as:

$$\tilde{R}(x, y) = R(x, y) + \left[\sum_{i=0}^{N_0-2} c_i(f_{i,0} + f_{i,1})\right] + \left[\sum_{i=N_0}^{N_0+N_1-1} c_i g_i\right] \quad (12)$$

In the above equation, the filtering is separated into 2 parts:

Filter part 1:

$$\left[\sum_{i=0}^{N_0-2} c_i(f_{i,0} + f_{i,1})\right]:$$

filtering by using neighbouring samples, geometric transformation may be applied. $N_0$ is the number of coefficients. The filter shape and size may, for example, be 5×5, 7×7, 9×9, 11×11, or 13×13 diamond filter or a filter of some other shape.

Filter part 2:

$$\left[\sum_{i=N_0}^{N_0+N_1-1} c_i g_i\right]:$$

filtering by using intermediately filtered samples, geometric transformation may be applied. $N_1$ is the number of coefficients. The function $f_{i,j}$ with j=0 or 1 may be defined with clipping functions as $$f_{i,j} = f_{i,j}(R(x + x_{i,j}, y + y_{i,j}), R(x, y)) \quad (13)$$
$$= \min(b_i, \max(-b_i, R(x + x_{i,j}, y + y_{i,j}) - R(x, y)))$$

The function $g_i$ may be defined with clipping functions as $$g_i = g_i(R'(x, y, i - N_0), R(x, y)) \quad (14)$$
$$= \min(b_i, \max(-b_i, R'(x, y, i - N_0) - R(x, y)))$$

$b_i$ is the clipping parameter corresponding to coefficient $c_i$. In ECM-1.0, $N_1=2$.

Video decoder 300 may be configured to use reconstructed samples before deblocking filter for ALF. In JVET-Z0146 and JVET-AA0095 proposed using reconstructed samples before deblocking filter for ALF.

As discussed above, in video coding, such as H.266/VVC, ALF is applied to minimize the mean square error between filtered samples and original samples. In VVC, ALF is applied after SAO, and the reconstruction signal before deblocking filter is also fed into the ALF unit.

Video decoder 300 may be configured to use prediction or residual data for ALF. JVET-AB0181 and JVET-AC0162 proposed utilizing the prediction samples or the residual samples as additional inputs to the ALF. JVET-AC0173 proposed using a third classifier is added to ALF which is applied to residual samples is proposed.

Using the prediction samples or the residual samples as additional inputs to the ALF requires extra buffers to store those samples until the samples are used in the ALF stage. In a typical hardware design, usually, this requires LCU-level pipeline processing, which means the results for the next stage are buffered after processing from current stage. In this case, residuals being used for both classifications and filtering processing in ALF involves holding the LCU's residuals for extra two more stages (DB and SAO). The above LCU-level residuals buffering concept is shown in FIG. 11.

Similarly, if the reconstructed samples before deblock filtering are used for ALF, the reconstructed samples need to be buffered and held for two extra stages (DB 1242 and SAO 1244).

Figure 11:
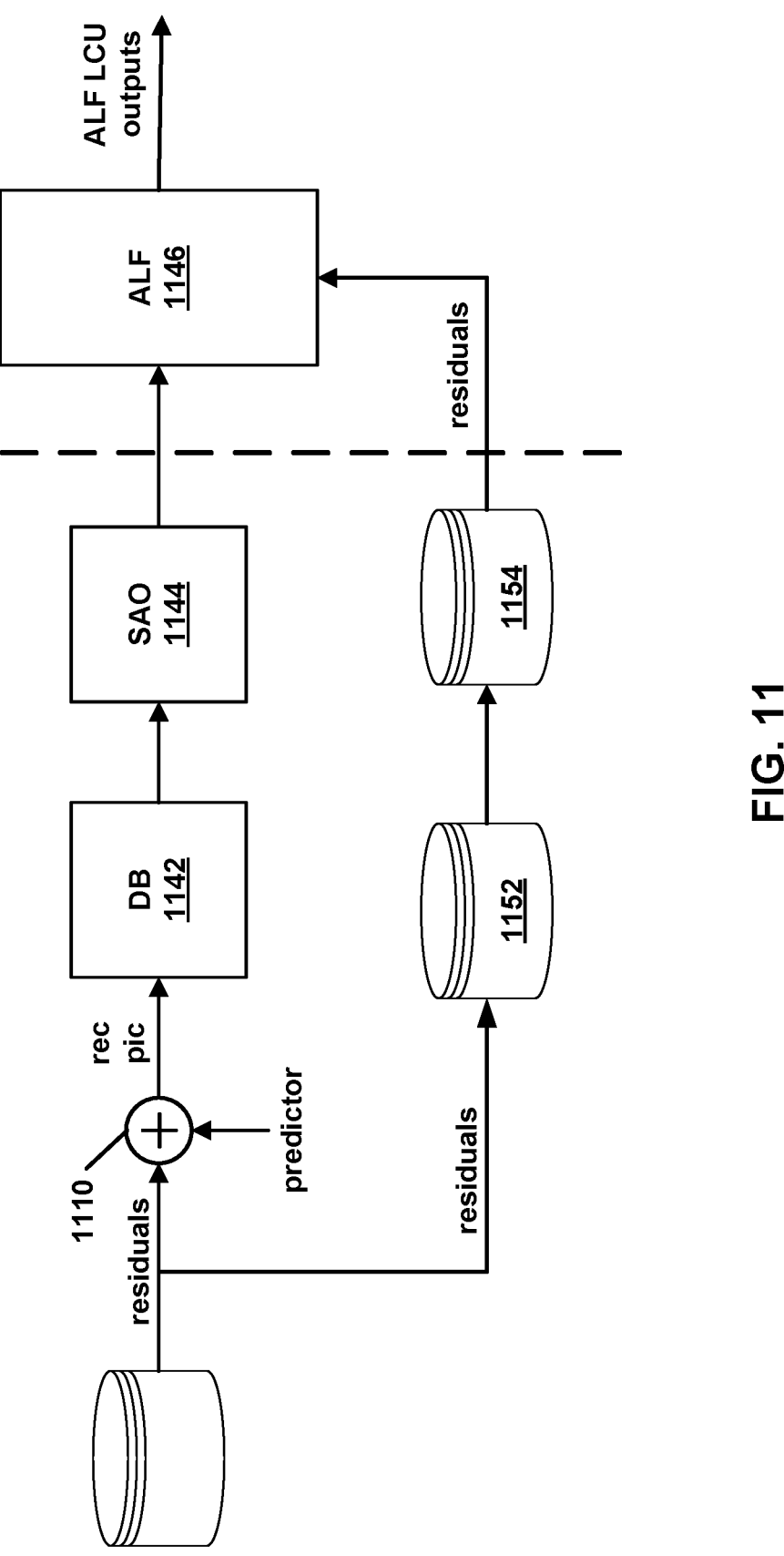
FIG. 11 shows an example of LCU-level residual buffering.

In the example of FIG. 11, summer 1110 adds residuals to a predictor to form a reconstructed picture, or portion of a reconstructed picture, such as one or more blocks. The portion of the reconstructed picture are filtered by deblocking filter 1142 and SAO 1144. While the portion of the reconstructed picture is being filtered by deblocking filter 1142 and SAO 1144, the residuals are stored in buffers 1152 and 1154. Buffers 1152 and 1154 are shown in FIG. 11 to represent two different stages of buffering but may in fact be implemented as a single memory or portion of memory. ALF 1146 filters the output of SAO 1144 and, as described above, may determine one or more filters based on the residuals stored in buffer 1154.

Figure 12:
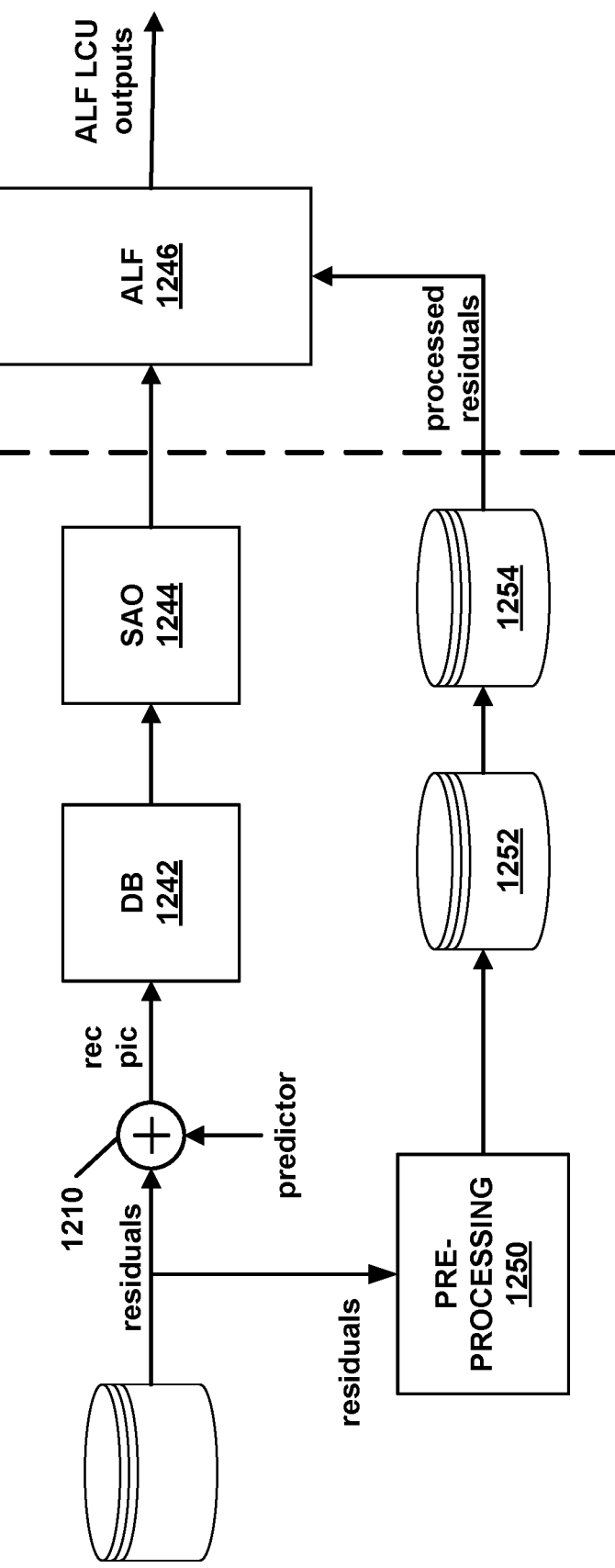
FIG. 12 shows an example of residual pre-processing before storing for ALF.

This disclosure describes techniques for preprocessing of the prediction or residual samples to reduce the amount of data that is required to be stored for ALF. Also, the preprocessing may increase the robustness of the data and therefore improve the performance of ALF. In this process, the prediction or residual samples are preprocessed before being stored for use in ALF. The process may include filtering and/or subsampling of the data (here "data" refers to the prediction or residual samples depending on which one is used). In the example of FIG. 12, the residual data is pre-processed before being stored and used for ALF. Typically, the filtering uses a smooth filter or a low-pass filter or simply averaging over a predefined support area.

In the example of FIG. 12, summer 1210 adds residuals to a predictor to form a reconstructed picture, or portion of a reconstructed picture, such as one or more blocks. The portion of the reconstructed picture are filtered by deblocking filter 1242 and SAO 1244. Unlike FIG. 11, where the actual residuals are stored, in the example of FIG. 12, pre-processing unit 1250 processes the residual data and the processed residual data is stored in buffers 1252 and 1234. Buffers 1252 and 1254 are shown separately in FIG. 12 to represent two different stages of buffering but may in fact be implemented as a single memory or portion of memory. ALF 1246 filters the output of SAO 1244 and, as described above, may determine one or more filters based on the residuals stored in buffer 1254.

If the residuals are used for classification only, then it may not be necessary to store the residuals for two extra stages because no filters are actually applied to the residuals. Accordingly, the described pre-processing for classification derivation may be performed on the residuals at the reconstruction (or DB) stage, and then only the classification result needs to be buffered, which may require a smaller buffer (lower complexity). This concept is shown in FIG. 13.

Figure 13:
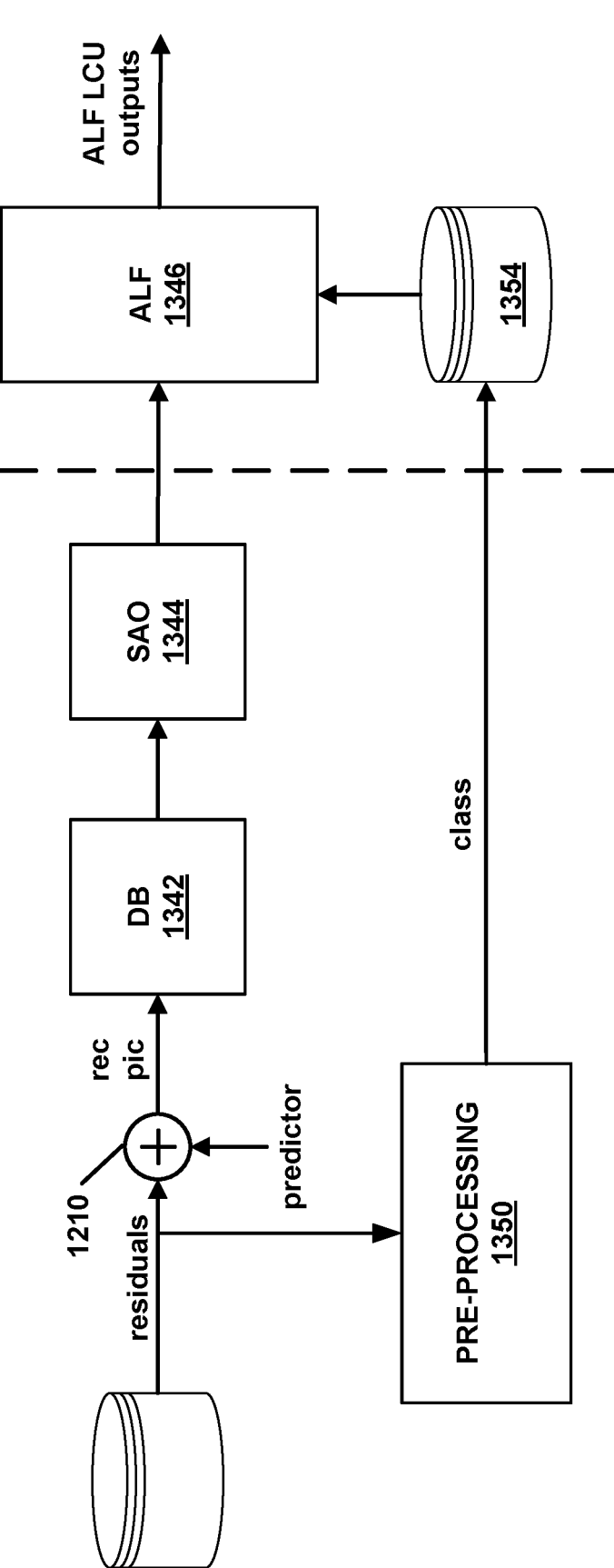
FIG. 13 shows an example of residual pre-processing for classifications.

In the example of FIG. 13 summer 1310 adds residuals to a predictor to form a reconstructed picture, or portion of a reconstructed picture, such as one or more blocks. The portion of the reconstructed picture are filtered by deblocking filter 1342 and SAO 1344. Unlike FIG. 11, where the actual residuals are stored, in the example of FIG. 13, pre-processing unit 1250 processes the residual data to determine a class and the class is stored in buffer 1354. ALF 1346 filters the output of SAO 1344 and, as described above, may determine one or more filters based on the class stored in buffer 1354.

Video decoder 300 may be configured to use residual data as additional input data for filtering in ALF. In some examples, the residual data may be pre-processed before being stored and used in ALF. The process can also be used for the application that prediction data or both prediction and residual data are used. Specifically, the process includes a subsampling to reduce the amount of data to be stored. Note that upsampling may be required when the data is used in ALF. However, in some implementations, upsampling can be done implicitly. For example, the subsampling rate is M in horizontal direction and N in vertical direction, then the sample with coordinate (m, n) corresponds to the sample with coordinate (m/M, n/N) in subsampled data.

When subsample the residual samples for ALF, a representative sample value is derived for each subblock of samples. Assuming the width and height of the original data are W and H, the subblock width and height are sW and sH, then the subsampling rates are W/sW in the horizontal direction and H/sH in the vertical direction. The subblock size may be adaptively selected and signaled in the bitstream (high level syntax for example).

In one example, the representative sample in a subblock is derived by choosing any of the sample in the subblock, for example, the top-left sample, the sample located at the "center" with coordinate (sW/2−1, sH/1) respect to the top-left sample, et al.

In another example, the representative sample in a subblock is derived by averaging all or some of the sample values in the subblock or the sample values in a surrounding window of the subblock. All the samples may share the same weight, or have different weight depending on the location (for example, samples near the center of the subblock have more weight).

In yet another example, a filtering process may be applied. For example, smoothing using a bilinear filter, a Gauss filter, or another filter may be used. The filter can be an offline trained fixed filter, or selected from a set of offline trained filters. If a filter is selected from a set of filters, the index may be signaled in the bitstream as one of the ALF parameters. The filtering may be applied before subsampling or applied without subsampling. In another example, the filter coefficients may be signaled.

Video decoder 300 may be configured to use residual data for classification in ALF. In some examples, the residual data is pre-processed before being used for classification in ALF, as illustrated in FIG. 13. The pre-processing includes a filtering process, typically smoothing or low pass filter to increase the robustness of the classification result.

Video decoder 300 may be configured to use residual data as additional input data for both classification and filtering in ALF.

In one example, the same pre-processed residual data is used for classification and filtering in ALF.

In another example, the pre-processed residual data is stored and used for filtering in ALF. However, the original residual data is used for classification in ALF, therefore the classification result can be stored as extra data that feeds into ALF stage.

In another example, a first pre-processing process is used for residual data that is stored and used for filtering in ALF, a second pre-processing process is used for residual data that is used for classification in ALF. Typically, the first process may include subsampling to reduce the amount of data that need to be stored. The second process may only include filtering process without subsampling, the classification result instead of the pre-processed residual data is stored.

Figure 14:
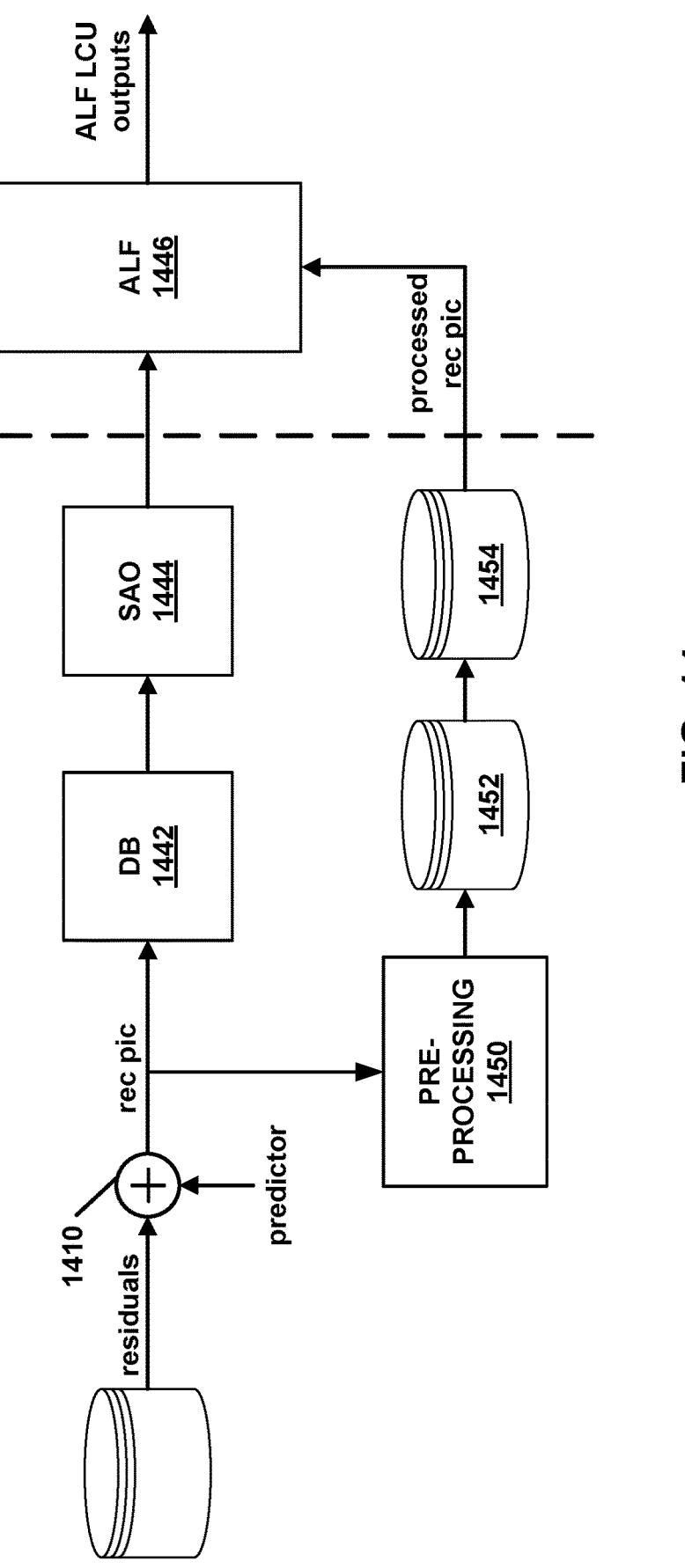
FIG. 14 shows an example of preprocessing for a reconstructed signal before being stored for ALF.

In some examples, video decoder 300 may be configured to perform pre-processing for the reconstruction data before deblocking filter. In the example of FIG. 14, summer 1410 adds residuals to a predictor to form a reconstructed picture, or portion of a reconstructed picture, such as one or more blocks. The portion of the reconstructed picture are filtered by deblocking filter 1442 and SAO 1444. Unlike FIG. 11, where the actual residuals are stored, in the example of FIG. 14, pre-processing unit 1450 processes the reconstructed picture or portion thereof, and the processed reconstruction data is stored in buffers 1452 and 1454. Buffers 1452 and 1454 are shown separately in FIG. 14 to represent two different stages of buffering but may in fact be implemented as a single memory or portion of memory. ALF 1446 filters the output of SAO 1444 and, as described above, may determine one or more filters based on the processed reconstruction data stored in buffer 1454.

As described above, video decoder 300 may feed the reconstruction signal before deblocking filter into the ALF module as an additional input. Therefore, reconstruction signal before deblocking filter need to be stored. This disclosure describes techniques for preprocessing the reconstruction signal before being stored. Similar to the processes described in the above, the pre-processing may include filter or/and subsampling. However, the filter can be any of the following types: low-pass filter, high-pass filter or smoothing filter. Subsampling maybe applied to reduce the amount of data needed to be stored.

Figure 15:
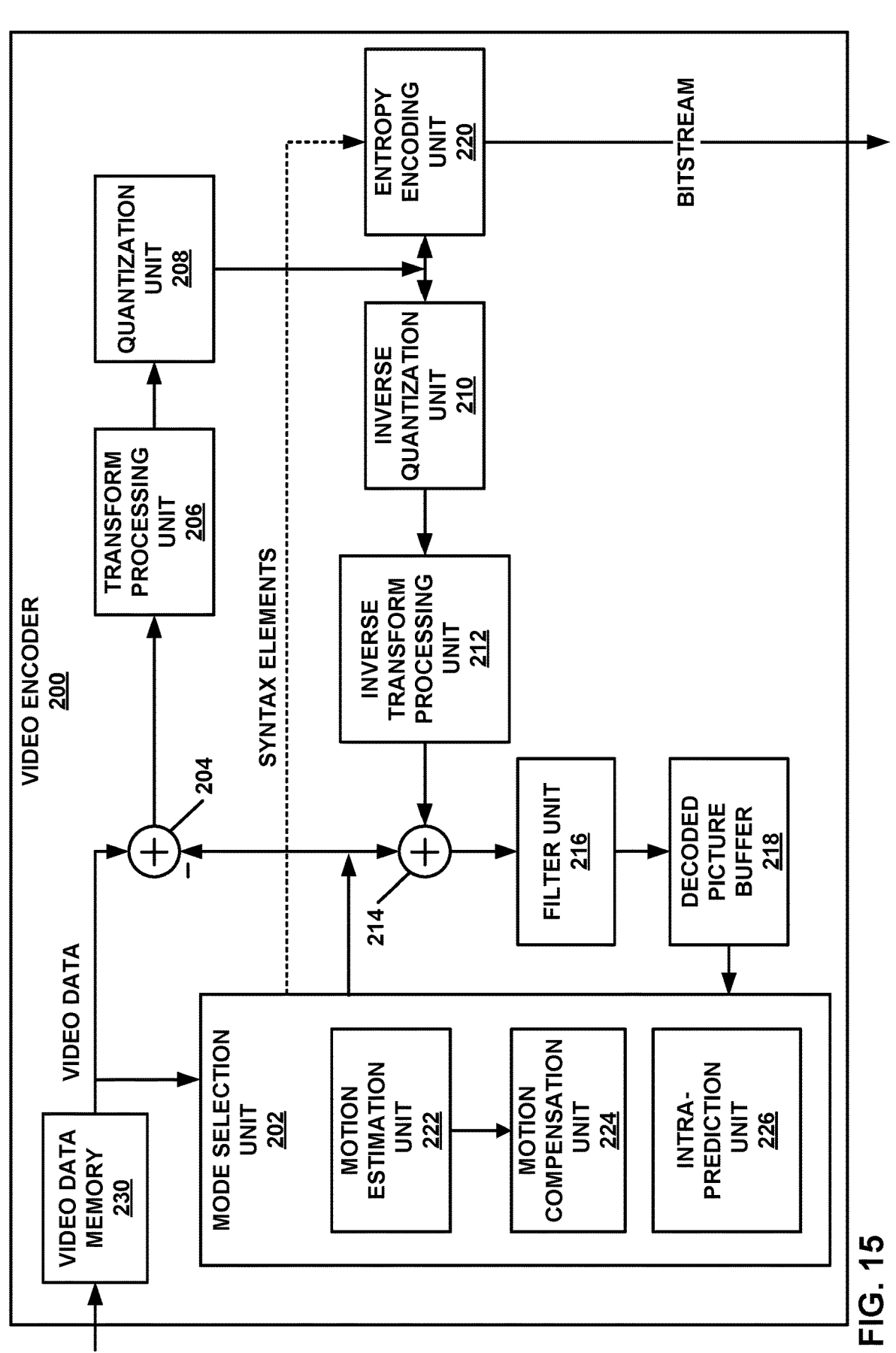
FIG. 15 is a block diagram illustrating an example video encoder that may perform the techniques of this disclosure.

FIG. 15 is a block diagram illustrating an example video encoder 200 that may perform the techniques of this disclosure. FIG. 15 is provided for purposes of explanation and should not be considered limiting of the techniques as broadly exemplified and described in this disclosure. For purposes of explanation, this disclosure describes video encoder 200 according to the techniques of VVC and HEVC. However, the techniques of this disclosure may be performed by video encoding devices that are configured to other video coding standards and video coding formats, such as AV1 and successors to the AV1 video coding format.

In the example of FIG. 15, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. For instance, the units of video encoder 200 may be implemented as one or more circuits or logic elements as part of hardware circuitry, or as part of a processor, ASIC, or FPGA. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 15 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the instructions (e.g., object code) of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, a motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUS, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the MTT structure, QTBT structure, superblock structure, or the quad-tree structure described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

When operating according to the AV1 video coding format, motion estimation unit 222 and motion compensation unit 224 may be configured to encode coding blocks of video data (e.g., both luma and chroma coding blocks) using translational motion compensation, affine motion compensation, overlapped block motion compensation (OBMC), and/or compound inter-intra prediction.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

When operating according to the AV1 video coding format, intra-prediction unit 226 may be configured to encode coding blocks of video data (e.g., both luma and chroma coding blocks) using directional intra prediction, non-directional intra prediction, recursive filter intra prediction, chroma-from-luma (CFL) prediction, intra block copy (IBC), and/or color palette mode. Mode selection unit 202 may include additional functional units to perform video prediction in accordance with other prediction modes.

Mode selection unit 202 provides the prediction block to residual generation unit 204. Residual generation unit 204 receives a raw, unencoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit 202 does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as some examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

When operating according to AV1, transform processing unit 206 may apply one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a horizontal/vertical transform combination that may include a discrete cosine transform (DCT), an asymmetric discrete sine transform (ADST), a flipped ADST (e.g., an ADST in reverse order), and an identity transform (IDTX). When using an identity transform, the transform is skipped in one of the vertical or horizontal directions. In some examples, transform processing may be skipped.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the transform coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

When operating according to AV1, filter unit 216 may perform one or more filter operations on reconstructed blocks. For example, filter unit 216 may perform deblocking operations to reduce blockiness artifacts along edges of CUs. In other examples, filter unit 216 may apply a constrained directional enhancement filter (CDEF), which may be applied after deblocking, and may include the application of non-separable, non-linear, low-pass directional filters based on estimated edge directions. Filter unit 216 may also include a loop restoration filter, which is applied after CDEF, and may include a separable symmetric normalized Wiener filter or a dual self-guided filter.

Video encoder 200 stores reconstructed blocks in DPB 218. For instance, in examples where operations of filter unit 216 are not performed, reconstruction unit 214 may store reconstructed blocks to DPB 218. In examples where operations of filter unit 216 are performed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

In accordance with AV1, entropy encoding unit 220 may be configured as a symbol-to-symbol adaptive multi-symbol arithmetic coder. A syntax element in AV1 includes an alphabet of N elements, and a context (e.g., probability model) includes a set of N probabilities. Entropy encoding unit 220 may store the probabilities as n-bit (e.g., 15-bit) cumulative distribution functions (CDFs). Entropy encoding unit 220 may perform recursive scaling, with an update factor based on the alphabet size, to update the contexts.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding block and the chroma coding blocks.

Video encoder 200 represents an example of a device configured to encode video data including a memory configured to store video data, and one or more processing units implemented in circuitry and configured to determine a prediction block for a current block of the video data; determine a residual block for the current block of the video data; process reconstruction data of the current block to determine processed reconstruction data; store the processed reconstruction data; and perform adaptive ALF for the current block based on the processed reconstruction data. The reconstruction data may, for example, include one or both of prediction data output by motion compensation unit 224 or decoded residual data output by inverse transform processing unit 212.

Figure 16:
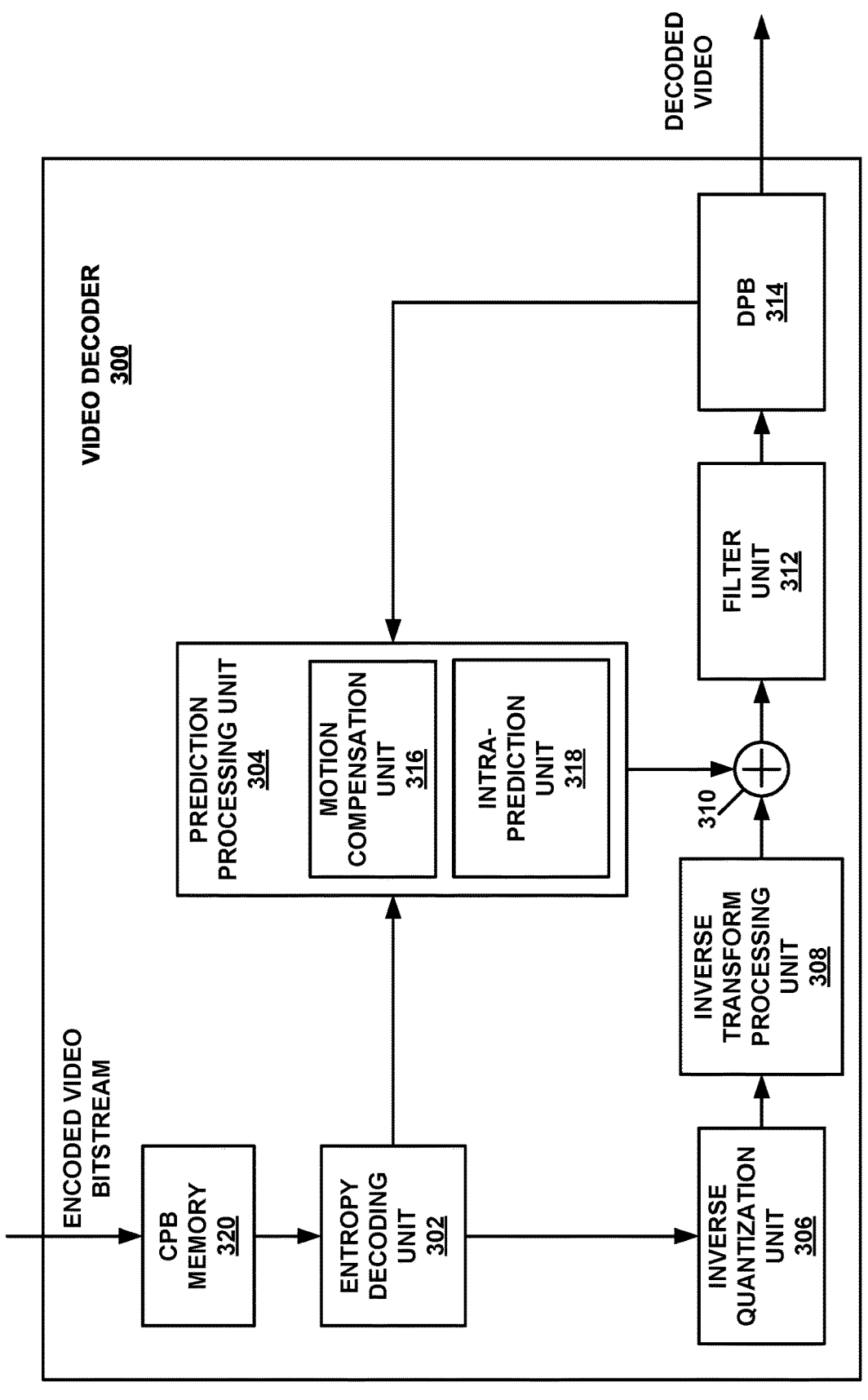
FIG. 16 is a block diagram illustrating an example video decoder that may perform the techniques of this disclosure.

FIG. 16 is a block diagram illustrating an example video decoder 300 that may perform the techniques of this disclosure. FIG. 16 is provided for purposes of explanation and is not limiting on the techniques as broadly exemplified and described in this disclosure. For purposes of explanation, this disclosure describes video decoder 300 according to the techniques of VVC and HEVC. However, the techniques of this disclosure may be performed by video coding devices that are configured to other video coding standards.

In the example of FIG. 16, video decoder 300 includes coded picture buffer (CPB) memory 320, entropy decoding unit 302, prediction processing unit 304, inverse quantization unit 306, inverse transform processing unit 308, reconstruction unit 310, filter unit 312, and DPB 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. For instance, the units of video decoder 300 may be implemented as one or more circuits or logic elements as part of hardware circuitry, or as part of a processor, ASIC, or FPGA. Moreover, video decoder 300 may include additional or alternative processors or processing circuitry to perform these and other functions.

Prediction processing unit 304 includes motion compensation unit 316 and intra-prediction unit 318. Prediction processing unit 304 may include additional units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

When operating according to AV1, motion compensation unit 316 may be configured to decode coding blocks of video data (e.g., both luma and chroma coding blocks) using translational motion compensation, affine motion compensation, OBMC, and/or compound inter-intra prediction, as described above. Intra-prediction unit 318 may be configured to decode coding blocks of video data (e.g., both luma and chroma coding blocks) using directional intra prediction, non-directional intra prediction, recursive filter intra prediction, CFL, IBC, and/or color palette mode, as described above.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as DRAM, including SDRAM, MRAM, RRAM, or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300.

The various units shown in FIG. 16 are illustrated to assist with understanding the operations performed by video decoder 300. The units may be implemented as fixed-function circuits, programmable circuits, or a combination thereof. Similar to FIG. 15, fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the transform coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 15).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 15). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. For instance, in examples where operations of filter unit 312 are not performed, reconstruction unit 310 may store reconstructed blocks to DPB 314. In examples where operations of filter unit 312 are performed, filter unit 312 may store the filtered reconstructed blocks to DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures (e.g., decoded video) from DPB 314 for subsequent presentation on a display device, such as display device 118 of FIG. 1.

In this manner, video decoder 300 represents an example of a video decoding device including a memory configured to store video data, and one or more processing units implemented in circuitry and configured to determine a prediction block for a current block of the video data; determine a residual block for the current block of the video data; process reconstruction data of the current block to determine processed reconstruction data; store the processed reconstruction data; and perform adaptive ALF for the current block based on the processed reconstruction data. The reconstruction data may, for example, include one or both of prediction data output by motion compensation unit 316 or decoded residual data output by inverse transform processing unit 308.

Figure 17:
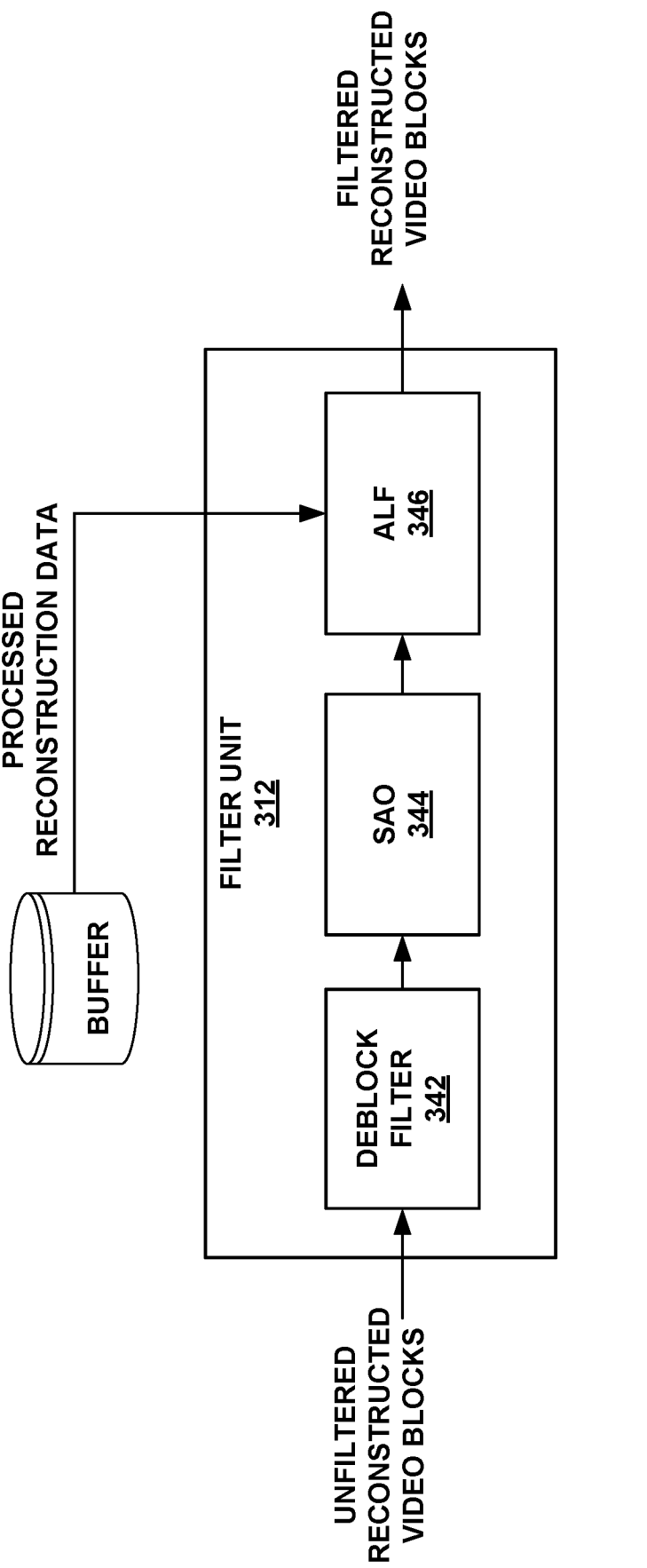
FIG. 17 is a block diagram illustrating an example filter unit for performing the techniques of this disclosure.

FIG. 17 shows an example implementation of filter unit 312 in FIG. 16. Filter unit 216 in FIG. 15 may be implemented in a substantially similar manner. Filter units 216 and 312 may perform the techniques of this disclosure, possibly in conjunction with other components of video encoder 200 or video decoder 300. In the example of FIG. 17, filter unit 312 includes deblock filter 342, SAO filter 344, and ALF unit 346. SAO filter 344 may, for example, be configured to determine offset values for samples of a block in the manner described in this disclosure. ALF unit 346 may likewise filter blocks of video data in the manner described in this disclosure.

Filter unit 312 may include fewer filters and/or may include additional filters. Additionally, the particular filters shown in FIG. 17 may be implemented in a different order. Other loop filters (either in the coding loop or after the coding loop) may also be used to smooth pixel transitions or otherwise improve the video quality. The filtered reconstructed video blocks output by filter unit 312 may be stored in DPB 314, which stores reference pictures used for subsequent motion compensation. DPB 314 may be part of or separate from additional memory that stores decoded video for later presentation on a display device, such as display device 118 of FIG. 1.

Filter unit 312, or some other unit of video decoder 300, may store the processed reconstruction data prior to, the operations of deblock filter 342 and SAO filter 344. The processed reconstruction data may then be an input to ALF unit 346.

Figure 18:
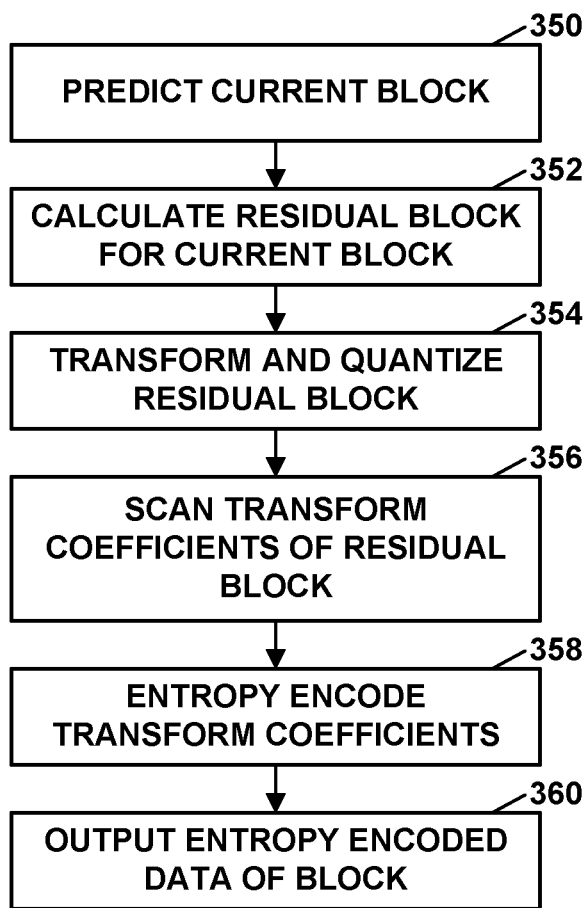
FIG. 18 is a flowchart illustrating an example process for encoding a current block in accordance with the techniques of this disclosure.

FIG. 18 is a flowchart illustrating an example process for encoding a current block in accordance with the techniques of this disclosure. The current block may be or include a current CU. Although described with respect to video encoder 200 (FIGS. 1 and 15), it should be understood that other devices may be configured to perform a process similar to that of FIG. 18.

In this example, video encoder 200 initially predicts the current block (350). For example, video encoder 200 may form a prediction block for the current block. Video encoder 200 may then calculate a residual block for the current block (352). To calculate the residual block, video encoder 200 may calculate a difference between the original, unencoded block and the prediction block for the current block. Video encoder 200 may then transform the residual block and quantize transform coefficients of the residual block (354). Next, video encoder 200 may scan the quantized transform coefficients of the residual block (356). During the scan, or following the scan, video encoder 200 may entropy encode the transform coefficients (358). For example, video encoder 200 may encode the transform coefficients using CAVLC or CABAC. Video encoder 200 may then output the entropy encoded data of the block (360).

Figure 19:
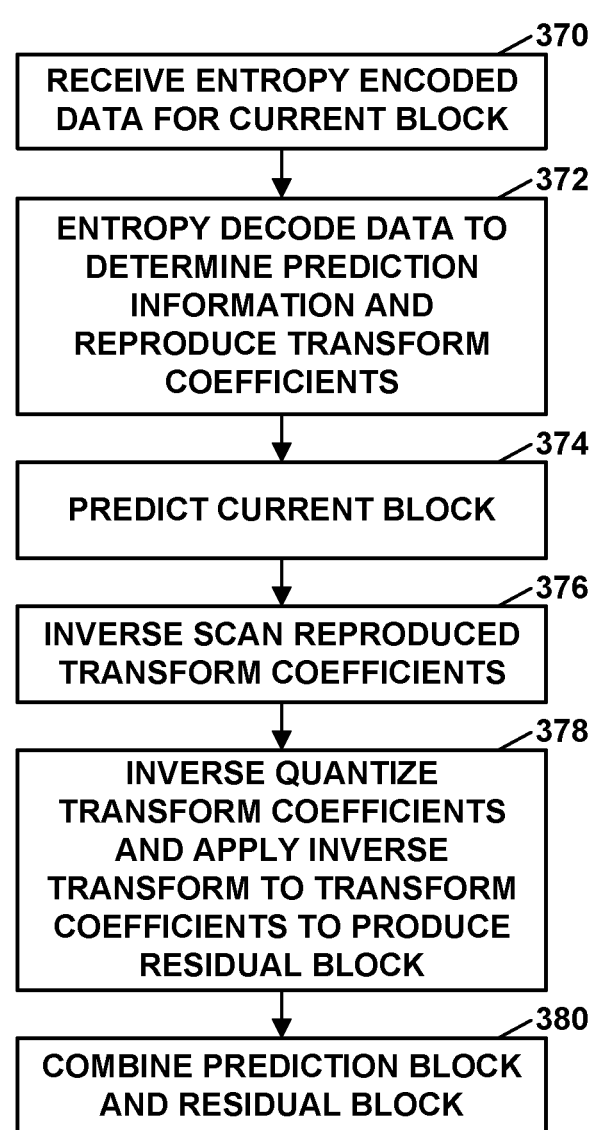
FIG. 19 is a flowchart illustrating an example process for decoding a current block in accordance with the techniques of this disclosure.

FIG. 19 is a flowchart illustrating an example process for decoding a current block of video data in accordance with the techniques of this disclosure. The current block may be or include a current CU. Although described with respect to video decoder 300 (FIGS. 1 and 16), it should be understood that other devices may be configured to perform a process similar to that of FIG. 19.

Video decoder 300 may receive entropy encoded data for the current block, such as entropy encoded prediction information and entropy encoded data for transform coefficients of a residual block corresponding to the current block (370). Video decoder 300 may entropy decode the entropy encoded data to determine prediction information for the current block and to reproduce transform coefficients of the residual block (372). Video decoder 300 may predict the current block (374), e.g., using an intra- or inter-prediction mode as indicated by the prediction information for the current block, to calculate a prediction block for the current block. Video decoder 300 may then inverse scan the reproduced transform coefficients (376), to create a block of quantized transform coefficients. Video decoder 300 may then inverse quantize the transform coefficients and apply an inverse transform to the transform coefficients to produce a residual block (378). Video decoder 300 may ultimately decode the current block by combining the prediction block and the residual block (380).

Figure 20:
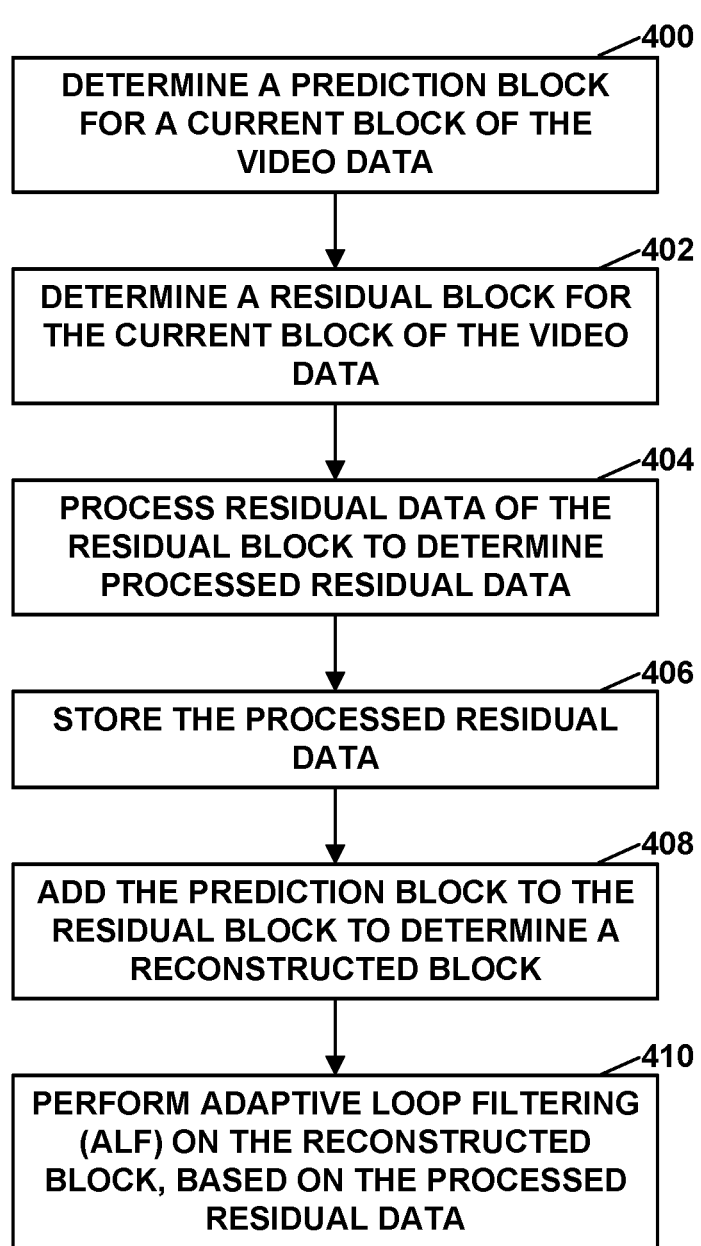
FIG. 20 is a flowchart illustrating an example process for decoding a current block in accordance with the techniques of this disclosure.

FIG. 20 is a flowchart illustrating an example process for decoding a current block of video data in accordance with the techniques of this disclosure. The current block may be or include a current CU. Although described with respect to video decoder 300 (FIGS. 1 and 16), it should be understood that other devices may be configured to perform a process similar to that of FIG. 19. Video encoder 200 may, for example, perform the techniques of FIG. 20 as part of a video encoding process.

Video decoder 300 determines a prediction block for a current block of the video data (400). Video decoder 300 may, for example, determine the prediction block using intra prediction, inter prediction, or any other such prediction process. Video decoder 300 determines a residual block for the current block of the video data (402). Video decoder 300 may, for example, determine the residual value by inverse quantizing transform coefficients received in the bitstream and inverse transforming the dequantized transform coefficients. In other examples, one or both of the inverse transform process and the inverse quantization process may be skipped.

Video decoder 300 processes residual data of the residual block to determine processed residual data (404). In some examples, to process the residual data to determine the processed residual data, video decoder 300 may subsample sample values of the residual block. In such examples, the processed residual data may include the subsampled sample values of the residual block. In some examples, to process the residual data to determine the processed residual data, video decoder 300 may determine a classification for the ALF based on the residual data. In such examples, the processed residual data may include the classification, and to perform the ALF on the reconstructed block, video decoder 300 may be configured to select a filter based on the classification as described above. In some examples, to process the residual data to determine the processed residual data, video decoder 300 may filter sample values of the residual block. In such examples, the processed residual data may include the filtered sample values of the residual block.

Video decoder 300 stores the processed residual data (406). Video decoder 300 may, for example, store the processed residual data before performing one or both of the deblock filtering and sample adaptive offset filtering on the reconstructed block.

Video decoder 300 adds the prediction block to the residual block to determine a reconstructed block (408). Video decoder 300 performs ALF on the reconstructed block, based on the processed residual data (410). Video decoder 300 may, for example, perform the ALF on the reconstructed block after performing one or both of deblock filtering and sample adaptive offset filtering on the reconstructed block.

Video decoder 300 may then output a picture of decoded video data for display, for storage, or for use in decoding other frames of video data. In examples where the process of FIG. 20 is performed by a video decoding loop of a video encoder, the video encoder may, for example, output the decoded picture for use in encoding other pictures of video data.

The following numbered clauses illustrate one or more aspects of the devices and techniques described in this disclosure.

Clause 1A: A method of decoding video data, the method comprising: determining a prediction block for a current block of the video data; determining a residual block for the current block of the video data; processing reconstruction data of the current block to determine processed reconstruction data, wherein the reconstruction data comprises one or more of the prediction block or the residual block; storing the processed reconstruction data; and performing adaptive loop filtering (ALF) for the current block based on the processed reconstruction data.

Clause 2A: The method of clause 1A, wherein processing the reconstruction data of the current block to determine the processed reconstruction data comprises filtering the reconstruction data.

Clause 3A: The method of clause 1A or 2A, wherein processing the reconstruction data of the current block to determine the processed reconstruction data comprises subsampling the reconstruction data.

Clause 4A: The method of any of clauses 1A-3A, wherein processing the reconstruction data of the current block to determine the processed reconstruction data comprises determining a classification for the ALF based on the reconstruction data.

Clause 5A: The method of any of clauses 1A-4A, wherein performing the ALF for the current block based on the processed reconstruction data comprises performing the ALF on a filtered version of a reconstructed block.

Clause 6A: The method of clause 5A, further comprising: storing the processed reconstruction data before performing filtering to determine the filtered version of the reconstructed block.

Clause 7A: The method of any of clauses 1A-6A, wherein the method of decoding the video data is performed as part of a video encoding process.

Clause 8A: A device for coding video data, the device comprising one or more means for performing the method of any of clauses 1A-7A.

Clause 9A: The device of clause 8A, wherein the one or more means comprise one or more processors implemented in circuitry.

Clause 10A: The device of any of clauses 8A and 9A, further comprising a memory to store the video data.

Clause 11A: The device of any of clauses 8A-10A, further comprising a display configured to display decoded video data.

Clause 12A: The device of any of clauses 8A-11A, wherein the device comprises one or more of a camera, a computer, a mobile device, a broadcast receiver device, or a set-top box.

Clause 13A: The device of any of clauses 8A-12A, wherein the device comprises a video decoder.

Clause 14A: The device of any of clauses 8A-13A, wherein the device comprises a video encoder.

Clause 15A: A computer-readable storage medium having stored thereon instructions that, when executed, cause one or more processors to perform the method of any of clauses 1A-7A.

Clause 1B: A method of decoding video data, the method comprising: determining a prediction block for a current block of the video data; determining a residual block for the current block of the video data; processing residual data of the residual block to determine processed residual data; storing the processed residual data; adding the prediction block to the residual block to determine a reconstructed block; and performing adaptive loop filtering (ALF) on the reconstructed block, based on the processed residual data.

Clause 2B: The method of clause 1B, wherein processing the residual data to determine the processed residual data comprises subsampling sample values of the residual block, wherein the processed residual data comprises the subsampled sample values of the residual block.

Clause 3B: The method of clause 1B, wherein processing the residual data to determine the processed residual data comprises determining a classification for the ALF based on the residual data, wherein the processed residual data comprises the classification, and wherein performing the ALF on the reconstructed block comprises selecting a filter based on the classification.

Clause 4B: The method of clause 1B, wherein processing the residual data to determine the processed residual data comprises filtering sample values of the residual block, wherein the processed residual data comprises the filtered sample values of the residual block.

Clause 5B: The method of any of clauses 1B-4B, wherein the processed residual data comprises less data than the residual data.

Clause 6B: The method of any of clauses 1B-5B, wherein performing the ALF on the reconstructed block comprises performing ALF on the reconstructed block after performing one or both of deblock filtering and sample adaptive offset filtering on the reconstructed block.

Clause 7B: The method of clause 6B, further comprising: storing the processed residual data before performing the one or both of the deblock filtering and the sample adaptive offset filtering on the reconstructed block.

Clause 8B: The method of any of clauses 1B-7B, wherein the method of decoding the video data is performed as part of a video encoding process.

Clause 9B: A device for decoding video data, the device comprising: a memory configured to store video data; one or more processors implemented in circuitry and configured to: determine a prediction block for a current block of the video data; determine a residual block for the current block of the video data; process residual data of the residual block to determine processed residual data; store the processed residual data; add the prediction block to the residual block to determine a reconstructed block; and perform adaptive loop filtering (ALF) on the reconstructed block, based on the processed residual data.

Clause 10B: The device of clause 9B, wherein to process the residual data to determine the processed residual data, the one or more processors are further configured to subsample sample values of the residual block, wherein the processed residual data comprises the subsampled sample values of the residual block.

Clause 11B: The device of clause 9B, wherein to process the residual data to determine the processed residual data, the one or more processors are further configured to determine a classification for the ALF based on the residual data, wherein the processed residual data comprises the classification, and wherein to perform the ALF on the reconstructed block, the one or more processors are further configured to select a filter based on the classification.

Clause 12B: The device of clause 9B, wherein to process the residual data to determine the processed residual data, the one or more processors are further configured to filter sample values of the residual block, wherein the processed residual data comprises the filtered sample values of the residual block.

Clause 13B: The device of any of clauses 9B-12B, wherein the processed residual data comprises less data than the residual data.

Clause 14B: The device of any of clauses 9B-13B, wherein to perform the ALF on the reconstructed block, the one or more processors are further configured to perform ALF on the reconstructed block after performing one or both of deblock filtering and sample adaptive offset filtering on the reconstructed block.

Clause 15B: The device of clause 14B, wherein the one or more processors are further configured to: store the processed residual data before performing the one or both of the deblock filtering and the sample adaptive offset filtering on the reconstructed block.

Clause 16B: The device of any of clauses 9B-15B, further comprising a display configured to display decoded video data.

Clause 17B: The device of any of clauses 9B-16B, wherein the device comprises one or more of a camera, a computer, a mobile device, a broadcast receiver device, or a set-top box.

Clause 18B: The device of any of clauses 9B-16B, wherein the device comprises a video decoder.

Clause 19B: The device of any of clauses 9B-16B, wherein the device comprises a video encoder.

Clause 20B: A computer-readable storage medium having stored thereon instructions that, when executed, cause one or more processors to: determine a prediction block for a current block of video data; determine a residual block for the current block of the video data; process residual data of the residual block to determine processed residual data; store the processed residual data; add the prediction block to the residual block to determine a reconstructed block; and perform adaptive loop filtering (ALF) on the reconstructed block, based on the processed residual data.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media may include one or more of RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
   determining a prediction block for a current block of the video data;
   determining a residual block for the current block of the video data;
   subsampling sample values of the residual block to determine processed residual data, the processed residual data comprising the subsampled sample values of the residual block;

storing the processed residual data;
   adding the prediction block and the residual block to determine a reconstructed block;
   determining a filter, from a set of filters, based on the processed residual data; and
   performing adaptive loop filtering (ALF) on the reconstructed block, based on the determined filter.

2. The method of claim 1, wherein the processed residual data comprises less data than the samples of the residual block.

3. The method of claim 1, wherein performing the ALF on the reconstructed block comprises performing ALF on the reconstructed block after performing one or both of deblock filtering and sample adaptive offset filtering on the reconstructed block.

4. The method of claim 3, further comprising:
   storing the processed residual data before performing the one or both of the deblock filtering and the sample adaptive offset filtering on the reconstructed block.

5. The method of claim 1, wherein the method of decoding the video data is performed as part of a video encoding process.

6. A device for decoding video data, the device comprising:
   a memory configured to store video data;
   one or more processors implemented in circuitry and configured to:
      determine a prediction block for a current block of the video data;
      determine a residual block for the current block of the video data;
      subsample sample values of the residual block to determine processed residual data, the processed residual data comprising the subsampled sample values of the residual block;
      store the processed residual data;
      add the prediction block and the residual block to determine a reconstructed block;
      determine a filter, from a set of filters, based on the processed residual data; and
      perform adaptive loop filtering (ALF) on the reconstructed block, based on the determined filter.

7. The device of claim 6, wherein the processed residual data comprises less data than the samples of the residual block.

8. The device of claim 6, wherein to perform the ALF on the reconstructed block, the one or more processors are further configured to perform ALF on the reconstructed block after performing one or both of deblock filtering and sample adaptive offset filtering on the reconstructed block.

9. The device of claim 8, wherein the one or more processors are further configured to:
   store the processed residual data before performing the one or both of the deblock filtering and the sample adaptive offset filtering on the reconstructed block.

10. The device of claim 6, further comprising a display configured to display decoded video data.

11. The device of claim 6, wherein the device comprises one or more of a camera, a computer, a mobile device, a broadcast receiver device, or a set-top box.

12. The device of claim 6, wherein the device comprises a video decoder.

13. The device of claim 6, wherein the device comprises a video encoder.

14. A non-transitory computer-readable storage medium having stored thereon instructions that, when executed, cause one or more processors to:

determine a prediction block for a current block of video data;

determine a residual block for the current block of the video data;

subsample sample values of the residual block to determine processed residual data, the processed residual data comprising the subsampled sample values of the residual block;

store the processed residual data;

add the prediction block to the residual block to determine a reconstructed block;

determine a filter, from a set of filters, based on the processed residual data; and perform adaptive loop filtering (ALF) on the reconstructed block, based on the determined filter.

\* \* \* \* \*